(12) United States Patent
Rohlinger

(10) Patent No.: US 11,181,137 B2
(45) Date of Patent: Nov. 23, 2021

(54) FASTENER SYSTEMS AND ASSEMBLIES FOR COUPLING A PART TO A COMPOSITE STRUCTURE, AND RELATED METHODS

(71) Applicant: The Boeing Company, Chicago, IL (US)

(72) Inventor: Paul L. Rohlinger, Charleston, SC (US)

(73) Assignee: The Boeing Company, Chicago, IL (US)

(*) Notice: Subject to any disclaimer, the term of this patent is extended or adjusted under 35 U.S.C. 154(b) by 388 days.

(21) Appl. No.: 16/417,475

(22) Filed: May 20, 2019

(65) Prior Publication Data

US 2020/0370582 A1 Nov. 26, 2020

(51) Int. Cl.
*F16B 11/00* (2006.01)
*B29C 70/86* (2006.01)
*B29L 31/30* (2006.01)

(52) U.S. Cl.
CPC ............ *F16B 11/002* (2013.01); *B29C 70/86* (2013.01); *B29L 2031/3082* (2013.01)

(58) Field of Classification Search
None
See application file for complete search history.

(56) References Cited

U.S. PATENT DOCUMENTS

| | | | | |
|---|---|---|---|---|
| 3,775,238 A | * | 11/1973 | Lyman | B29C 70/08 428/167 |
| 4,755,904 A | * | 7/1988 | Brick | B64D 45/02 244/1 A |
| 2009/0126180 A1 | * | 5/2009 | Keener | B29C 66/21 29/505 |

FOREIGN PATENT DOCUMENTS

| | | |
|---|---|---|
| DE | 202011001321 | 4/2011 |
| GB | 2552524 | 1/2018 |

OTHER PUBLICATIONS

European Patent Office, Extended European Search Report for related European Patent Application No. 20175673, dated Oct. 7, 2020.
Machine-generated English language translation of DE 202011001321, downloaded May 10, 2020.

* cited by examiner

*Primary Examiner* — Jeffry H Aftergut
(74) *Attorney, Agent, or Firm* — Dascenszo Gates Intellectual Property Law, P.C.

(57) ABSTRACT

Fastener systems may be used to couple a part to a composite structure such that at least a portion of the fastener system is embedded within the composite structure, and such that the fastener system may be installed via access to just one side of the composite structure. Examples of fastener systems include a receptacle that is inserted through at least one layer of the composite structure and a torque nail that is inserted into the receptacle, thereby expanding the receptacle into a collar plate, which is configured to distribute the forces from insertion of the torque nail. The collar plate is enclosed between respective laminates of the composite structure, such that the fastener system is configured to couple the part to the composite structure, either directly or via a structural connector, without the use of conventional drilling and bolting.

20 Claims, 11 Drawing Sheets

FASTENER SYSTEMS AND ASSEMBLIES FOR COUPLING A PART TO A COMPOSITE STRUCTURE, AND RELATED METHODS

FIELD

The present disclosure relates to fastener systems and assemblies for coupling a part to a composite structure, and related methods.

BACKGROUND

Bolts or other fasteners are often used to secure parts to composite structures, via holes drilled through the composite structure. Such bolts are often heavy and labor-intensive to install. Installation generally requires access to both sides of the composite structure, which can be difficult in certain cases. For example, when coupling parts (e.g., frames) to a composite structure, such as the skin of an aircraft fuselage, accessing the interior of the fuselage barrel may be very difficult, costly, complex, and/or time-consuming. Securing the frame, fittings, intercostals, and/or door surrounds to the fuselage skin generally requires drilling thousands of holes through the skin, inserting a fastener through one side of the skin, and applying a nut or collar to each fastener on the opposite side of the skin. Even with the use of industrial robots, such techniques require multiple people to install such fasteners and access to both sides of the composite structure.

SUMMARY

Presently disclosed fastener systems may be configured to secure parts (e.g., a frame) to a composite structure (e.g., an aircraft fuselage skin) without drilling holes through the composite structure and/or without requiring access to both sides of the composite structure. One exemplary example of presently disclosed fastener systems includes a receptacle configured to be embedded at least partially within the composite structure utilizing a torque nail, a collar plate, and a structural connector. The receptacle includes a receiving portion configured to receive at least a portion of a torque nail. The torque nail may be sized and shaped with respect to the receptacle such that it expands the receiving portion of the receptacle when pressed into the receiving portion. The collar plate may be configured to be embedded within the composite structure and to distribute forces from the torque nail being pressed into the receiving portion of the receptacle. Such disclosed fastener systems are configured to engage the part and the composite structure via the structural connector, such that the fastener system couples the part to the composite structure. Disclosed assemblies include such fastener systems along with a first laminate of composite material and a second laminate of composite material. The collar plate of the fastener system may be positioned between the first laminate and the second laminate. In some such assemblies, at least a portion of the structural connector of the fastener system may be positioned adjacent the first laminate of composite material.

According to presently disclosed methods, fastener systems may be partially assembled prior to installation within a composite structure. For example, a fastener assembly formed of a receptacle, a retainer, and a structural connector may be pre-assembled, with the other components of the fastener system (e.g., the torque nail and collar plate) being added later. For example, disclosed methods of assembling a fastener assembly may include providing the fastener assembly, positioning the retainer on the receptacle by sliding the retainer into a first retainer-receiving recess and a second retainer-receiving recess of the retainer, and positioning the structural connector on the receptacle. Positioning the structural connector may include compressing and/or plastically deforming a portion of the receptacle. In such fastener assemblies, the retainer may be configured to constrain the receptacle about the torque nail, and/or to prevent undue expansion of the receptacle when the torque nail is inserted into the receptacle.

Disclosed methods of installing a fastener system for coupling a part to a composite structure generally include embedding at least a portion of the fastener system between layers of the composite structure. For example, methods may include forming a first laminate of composite material having a receiving hole formed therethrough, and positioning the fastener assembly with respect to the first laminate of composite material such that a receptacle of the fastener assembly is at least partially inserted through the receiving hole. In such arrangements, the first laminate of composite material may engage a structural connector of the fastener assembly. The receptacle, the structural connector, and the retainer of the fastener assembly may be assembled together prior to the positioning the fastener assembly with respect to the first laminate, or such fastener assemblies may be assembled at the time the composite structure is built up. Methods may include securing a middle laminate of composite material to a first upper surface of the first laminate of composite material. The middle laminate of composite material may include a pocket configured to receive at least a portion of the receptacle therein. The pocket may be further configured to receive the collar plate of the fastener system, and thus methods may include positioning the collar plate onto the receptacle and into the pocket of the middle laminate of composite material, such that a lower plate surface of the collar plate engages the first upper surface of the first laminate of composite material.

Methods may further include inserting the torque nail of the fastener system into the receptacle and applying an outer laminate of composite material which covers the collar plate and at least a portion of the middle laminate of composite material, thereby embedding the collar plate between the outer laminate of composite material and the first laminate of composite material.

DESCRIPTION

Figure 1:
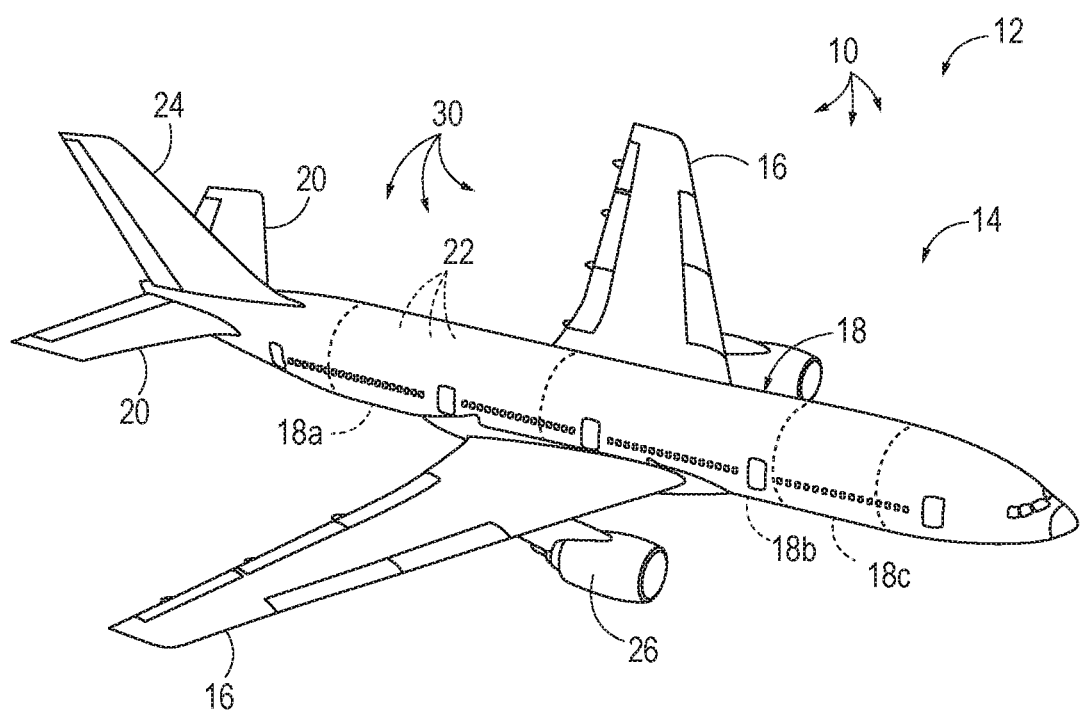
FIG. 1 is a perspective view of an aircraft which may be formed of one or more composite structures including one or more fastener systems and/or fastener assemblies according to the present disclosure.

With reference to FIG. 1, one or more composite structures 10 may be included in an apparatus 12. Composite structures 10 may be utilized in many different industries and applications, such as aerospace, automotive, electronic, construction, military, recreation, and/or motorsport industries. In FIG. 1, an example of apparatus 12 that may include one or more composite structures 10 generally is illustrated in the form of an aircraft 14. Aircraft 14 may take any suitable form, including commercial aircraft, military aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) rotorcraft and helicopters.

Apparatus 12 (e.g., aircraft 14) may include one or more composite structures 10. As illustrative, non-exclusive examples, composite structures 10 may be utilized in such aircraft structures as wings 16, fuselages 18 or fuselage sections 18a, 18b, 18c, horizontal stabilizers 20, overhead storage bins 22, vertical stabilizers 24, and engine housings 26; however, other components of aircraft 14 additionally or alternatively may include composite structures 10. Other applications in aircraft 14 for composite structures 10 include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, examples of apparatus 12 (including one or more composite structures 10) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly. One or more fastener systems 30 may be included within aircraft 14 (or other apparatus 12), in order to couple one or more parts to one or more composite structures 10. In a specific example, a plurality of fastener systems 30 may couple a frame to aircraft fuselage 18.

Figure 2:
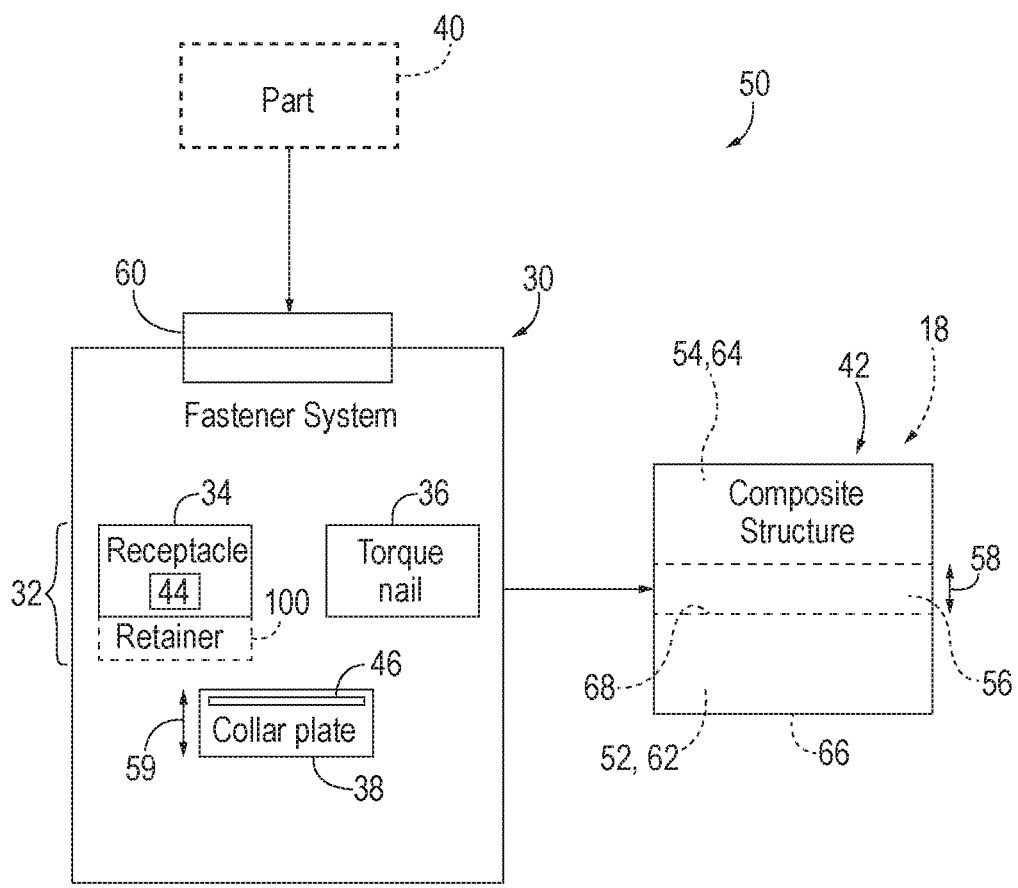
FIG. 2 is a schematic, black-box representation of non-exclusive examples of fastener systems including fastener assemblies, according to the present disclosure.

FIG. 2 schematically illustrates non-exclusive examples of fastener systems 30 and fastener assemblies 32 according to the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

As schematically shown in FIG. 2, fastener systems 30 generally include a receptacle 34, a torque nail 36, and a collar plate 38. Fastener systems 30 are configured for coupling a part 40 to a composite structure 42 (and composite structure 10 is an example of composite structure 42). Together, the components of fastener system 30 are configured to couple part 40 to composite structure 42 without requiring holes to be drilled through composite structure 42, and via access to a single side of composite structure 42. Specifically, and as will be described in detail in association with other Figures, fastener system 30 is configured to be at least partially embedded within composite structure 42, thereby securing fastener system 30 with respect to composite structure. Part 40 may then be coupled to fastener system 30, thereby effectively coupling part 40 to composite structure 42 as well. Thus, fastener system 30 engages part 40 and composite structure 42 such that it couples part 40 to composite structure 42.

Receptacle 34 is configured to be embedded at least partially within composite structure 42, and torque nail 36 is configured to be received at least partially within receptacle 34, such as at least partially within a receiving portion 44 of receptacle 34. Torque nail 36 may be sized and shaped with respect to receptacle 34 such that receiving portion 44 is expanded when torque nail 36 is pressed into receiving portion 44. Collar plate 38 is also configured to be at least partially embedded within composite structure 42 so as to distribute forces from torque nail 36 as it is pressed into receptacle 34 (e.g., into receiving portion 44 of receptacle 34). Receptacle 34 may be configured to effectively serve as an anchor component, anchoring fastener system 30 to composite structure 42.

In some examples, disclosed fastener systems 30 may be configured to install part 40 (e.g., a shear tie) with a single fastener system 30, rather than using a plurality of bolts of other fasteners for each part 40. Such a reduction and/or an elimination in the use of bolts, and the corresponding reduction and/or elimination in drilling through composite structure 42 may, in some examples, allow for relaxed tolerances for composite structure 42, which can reduce waste from having to scrap composite structures outside tolerances. Additionally or alternatively, disclosed fastener systems 30 may reduce and/or eliminate sanding needs during manufacturing, such as due to the reduction and/or elimination of drilling steps. Additionally or alternatively, disclosed fastener systems 30 may reduce and/or eliminate shimming when securing part 40 to composite structure 42, by zeroing out any irregularities in composite structure 42. Additionally or alternatively, presently disclosed fastener systems 30 may be configured to be installed with access to just one side of composite structure 42.

An assembly 50 (also referred to herein as a system 50) may thus be formed of fastener system 30 and composite structure 42. Composite structure 42 generally includes a plurality of laminates of composite material, such as first laminate 52, second laminate 54, and/or middle laminate 56, with middle laminate 56 being positioned between first laminate 52 and second laminate 54, when included. Each of first laminate 52, second laminate 54, and/or middle laminate 56 generally contains a plurality of layers, or plys, of composite material, as is well known to those of skill in the art. For example, first laminate 52, second laminate 54, and/or middle laminate 56 each may be formed of one or more layers of polymer-reinforced carbon fiber. When fastener system 30 is secured to composite structure 42, collar plate 38 is positioned between first laminate 52 and second laminate 54. In some examples, middle laminate of composite material 56 may have a laminate thickness 58 that is substantially equal to a plate thickness 59 of collar plate 38, such that collar plate 38 is substantially flush with middle laminate 56.

Assembly 50 also may include a structural connector 60, which may be part of fastener system 30 and/or coupled to fastener system 30. Structural connector 60 serves to couple part 40 to fastener system 30. When assembled, at least a portion of structural connector 60 may be positioned adjacent first laminate 52 of composite structure 42.

Components of fastener system 30 (e.g., receptacle 34, torque nail 36, collar plate 38, and/or structural connector 60) may be formed of any suitable materials, including but not limited to polymers, metals, and/or polymer reinforced composite materials (e.g., polymer reinforced carbon fiber). In some examples, one or more components of fastener system 30 may be formed of the same material. For example, receptacle 34 and torque nail 36 may be formed of the same metal. Additionally or alternatively, one or more components of fastener system 30 may be formed of different materials from one another. In a specific example, fastener system 30 may be formed of carbon fiber composite material. In some examples, components of fastener system 30 may be secured together using a flexible sealant. In examples where different components of fastener system 30 have different coefficients of thermal expansion, respective materials of one or more components may be selected to account for, or counteract, expansion or contraction of one or more other components of fastener system 30 in response to changes in temperature. For example, fastener systems 30 may include one or more components formed of a material with a negative coefficient of thermal expansion, such that one or more respective components may expand when exposed to decreasing temperatures, as opposed to one or more other respective components of fastener system 30, which may be configured to contract when exposed to decreasing temperatures.

In some specific examples, composite structure 42 may be an aircraft fuselage (e.g., aircraft fuselage 18), with first laminate of composite material 52 being an inner skin 62 for aircraft fuselage 18, and second laminate of composite material 54 being an outer skin 64 for aircraft fuselage 18. In this manner, a first inner surface 66 of first laminate of composite material 52 may be arranged to face an interior volume of aircraft fuselage 18, while a first outer surface 68 of first laminate of composite material 52 is opposite first inner surface 66 and faces second laminate of composite material 54.

Turning now to FIGS. 3-14, illustrative non-exclusive examples of system 50, fastener system 30, and/or components thereof are illustrated, in the form of system 51, fastener system 61, and components thereof. Where appropriate, the reference numerals from the schematic illustration of FIG. 2 are used to designate corresponding parts of system 51, fastener system 61, and/or components thereof; however, the examples of FIGS. 3-14 are non-exclusive and do not limit system 50, fastener system 30, and/or components thereof to the illustrated examples of FIGS. 3-14. That is, system 50, fastener system 30, and/or components thereof are not limited to the specific examples illustrated in FIGS. 3-14, and may incorporate any number of the various aspects, configurations, characteristics, properties, etc. that are illustrated in and discussed with reference to the schematic representation of FIG. 2 and/or the examples of FIGS. 3-14, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 3-14, however, it is within the scope of the present disclosure that the previously discussed features, variants, etc. may be utilized with system 51, fastener system 61, and/or components thereof, and vice versa.

Figure 3:
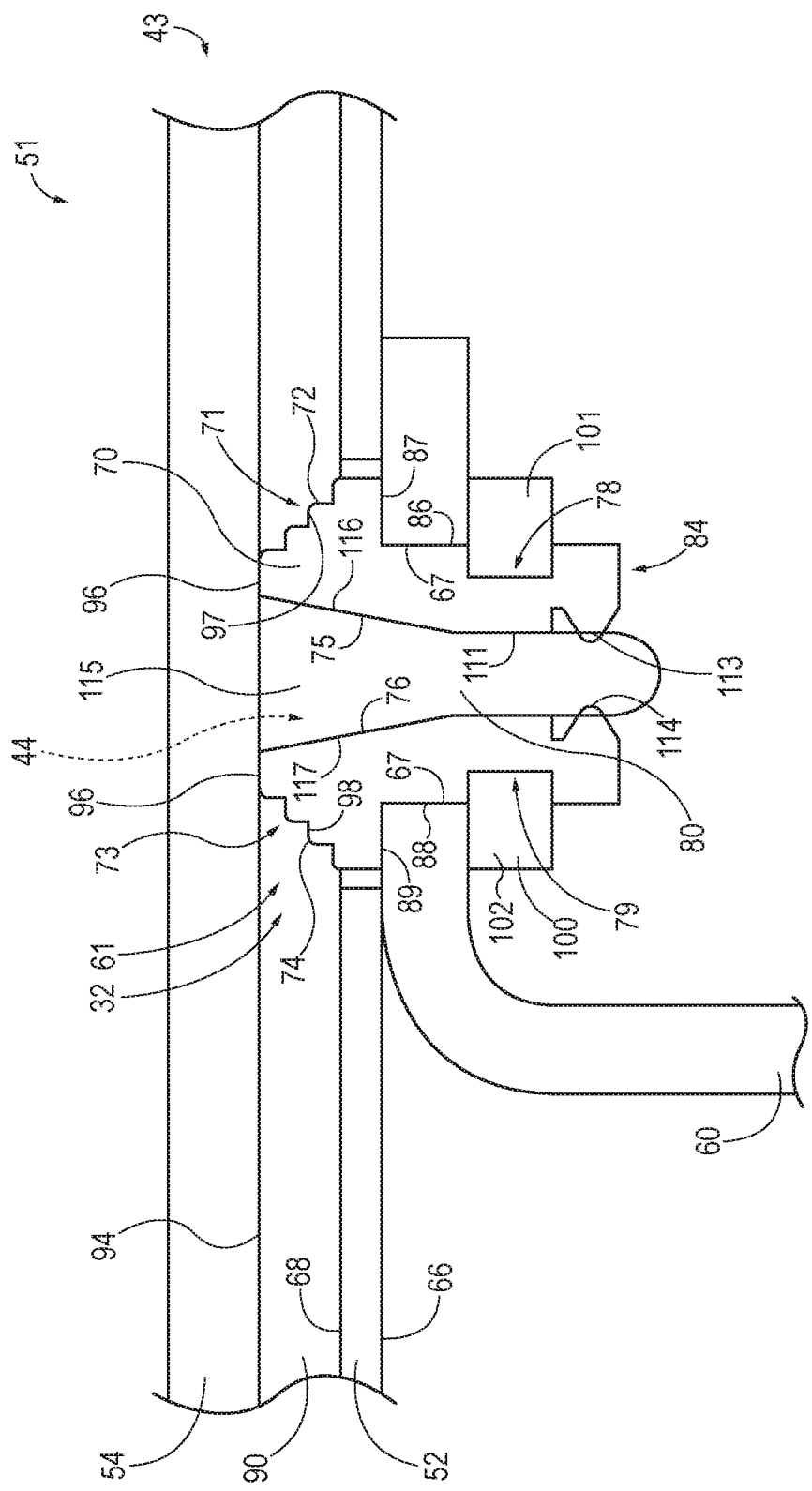
FIG. 3 is a cross-sectional view of an example of a fastener system according to the present disclosure.

FIG. 3 illustrates a somewhat schematic, cross-sectional view of system 51, as assembled with fastener system 61 partially embedded within composite structure 43 (which is an example of composite structure 42, and includes first laminate of composite material 52 and second laminate of composite material 54). A structural connector 60 engages a receptacle 70 (which is an example of receptacle 34), such that at least a portion of structural connector 60 is positioned adjacent first laminate of composite material 52. Fastener system 61 also includes a torque nail 80 (which is an example of torque nail 36) inserted into receptacle 70, and a collar plate 90 (which is an example of collar plate 38) engaged with receptacle 70 and embedded within composite structure 43. A retainer 100 also engages receptacle 70, as will be described in further detail herein. Thus, receptacle 70 is configured to engage a plurality of other components of fastener system 61.

Figure 4:
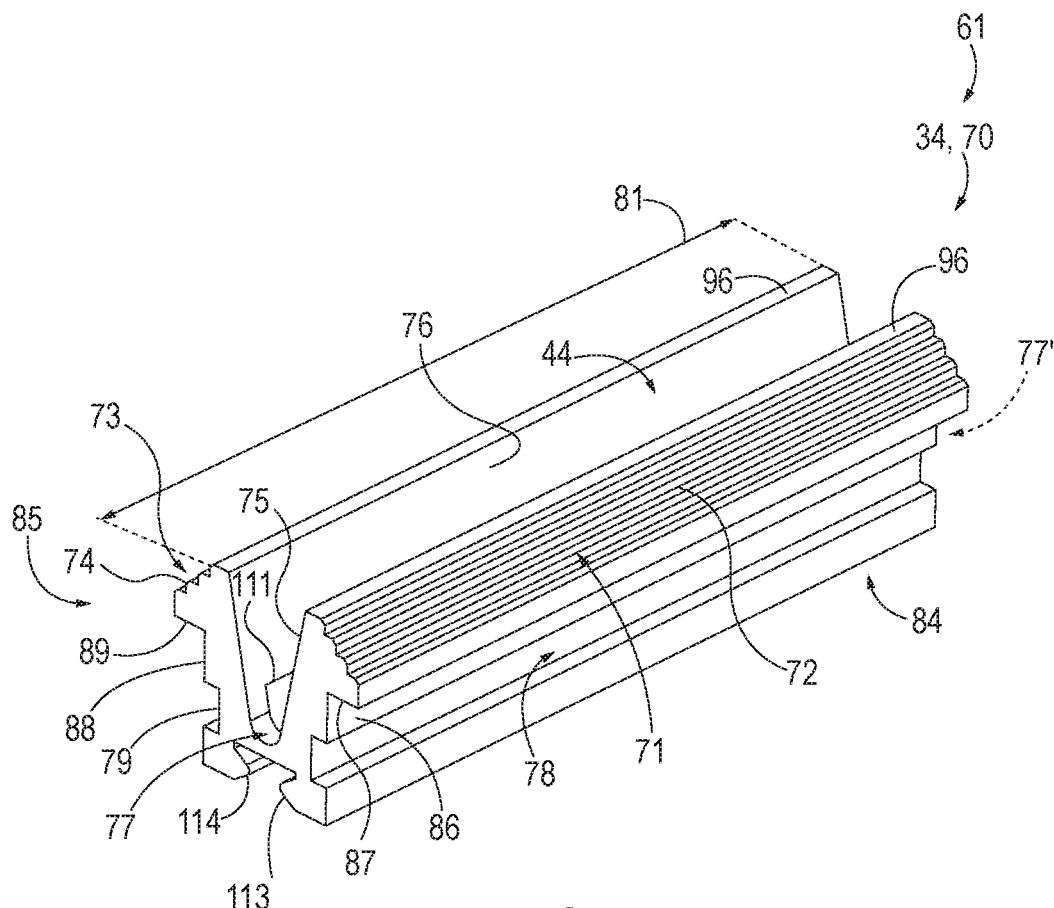
FIG. 4 is a perspective view of one example of a receptacle of a fastener system, according to the present disclosure.

FIG. 4 illustrates receptacle 70 of fastener system 61, shown separated from the other components of fastener system 61, for clarity. Receptacle 70 includes a first elongated grooved surface 71 having a first plurality of receptacle grooves 72 formed therein, and further includes a second elongated grooved surface 73 having a second plurality of receptacle grooves 74 formed therein. First and second pluralities of receptacle grooves 72, 74 are configured to engage collar plate 90.

Receptacle 70 also includes receiving portion 44, defined by a first inner receiving surface 75 and a second inner receiving surface 76. Said receiving portion 44 is configured to receive torque nail 80 such that torque nail 80 engages first and second inner receiving surfaces 75, 76 when torque nail 80 is positioned within receiving portion 44. A yield region 77 is formed on one end of receptacle 70, and a second yield region 77' is formed opposite yield region 77, on the other end of receptacle 70. Yield regions 77, 77' extend between first inner receiving surface 75 and second inner receiving surface 76. Yield regions 77, 77' are configured to bend and/or compress as fastener system 61 is assembled to accommodate engagement of other components with receptacle 70. For example, bending of receptacle 70 via yield regions 77, 77' may allow for the first and second elongated grooved surfaces 71, 73 to be temporarily and reversibly forced closer together as collar plate 90 is positioned on receptacle 70. Additionally or alternatively, bending of receptacle 70 via yield regions 77, 77' may allow for expansion of receiving portion 44 (e.g., first and second elongated grooved surfaces 71, 73 may be forced farther apart) when torque nail 80 is inserted into receiving portion 44. For example, forces from engagement of torque nail 80 pressing outwardly on first inner receiving surface 75 and second inner receiving surface 76 may urge these surfaces away from each other, with yield regions 77, 77' being intentionally engineered to accommodate a certain amount of such yield. For example, a thickness 121 (FIG. 13) of yield regions 77, 77' may be increased or decreased in various examples of receptacle 70 to accommodate the desired amount of bending, or compliance, of various structures of receptacle 70.

In some examples, at least a portion of first inner receiving surface 75 is knurled. Additionally or alternatively, at least a portion of second inner receiving surface 76 may be knurled. Additionally or alternatively, at least a portion of first inner receiving surface 75 and/or at least a portion of second inner receiving surface 76 may be smooth.

Figure 5:
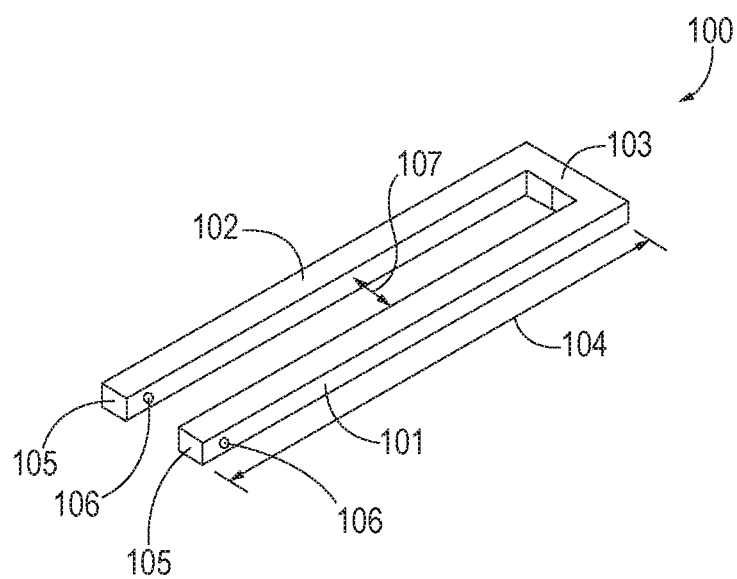
FIG. 5 is a perspective view of one example of a retainer of a fastener system, according to the present disclosure.

To engage retainer 100, receptacle 70 includes a first retainer-receiving recess 78 and a second retainer-receiving recess 79 positioned opposite one another. Receptacle 70 is configured to receive retainer 100 in first retainer-receiving recess 78 and second retainer-receiving recess 79. For example, as shown in FIG. 5, retainer 100 may be an elongated U-shaped retainer 100, with a first elongated portion 101 and a second elongated portion 102. When retainer 100 is positioned on receptacle 70, first elongated portion 101 of retainer 100 may be positioned within and/or engaged with first retainer-receiving recess 78, and second elongated portion 102 may be positioned within and/or engaged with second retainer-receiving recess 79. In some examples, a length 104 of retainer 100 is approximately equal to a length 81 (FIG. 4) of receptacle 70 such that ends 105 of first and second elongated portions 101, 102 may be substantially flush with receptacle 70 when retainer 100 is positioned on receptacle 70. In other examples, length 104 of retainer 100 may be less than length 81 of receptacle 70. In yet other examples, length 104 of retainer 100 may be greater than length 81 of receptacle 70, such that ends 105 extend beyond receptacle 70.

Retainer 100 may have a slip fit with first retainer-receiving recess 78 and second retainer-receiving recess 79 of receptacle 70. In other examples, retainer 100 has a press fit or friction fit with first retainer-receiving recess 78 and second retainer-receiving recess 79. Retainer 100 is generally configured to constrain receptacle 70, such as by limiting and/or preventing expansion of receptacle 70 via yield regions 77, 77' when receptacle 70 receives outward pressure from insertion of torque nail 80. Additionally or alternatively, retainer 100 may be configured to retain and/or constrain receptacle 70 about torque nail 80, to retain torque nail 80 in receptacle 70 once torque nail 80 is inserted into receptacle 70. Retainer 100 may be positioned on receptacle 70 before torque nail 80 is inserted, or may be positioned on receptacle 70 after torque nail 80 is inserted into receptacle 70. In some examples, retainer 100 may include one or more bores 106 for receiving one or more respective fasteners for securing retainer 100 on receptacle 70. In a specific example, retainer 100 is positioned on receptacle 70 before torque nail 80 is inserted, and one or more fasteners also may be installed within bores 106 of retainer 100 before torque nail is inserted into receptacle 70. Such fasteners may serve to tighten retainer 100 around receptacle 70 once retainer is positioned on receptacle 70. Such fasteners may be configured to elongate when torque nail 80 is inserted into receptacle 70 and presses outwardly on receptacle 70. For example, one or more fasteners may be installed into, or through, bores 106, and then torqued prior to insertion of torque nail 80. In some examples, when torque nail 80 is inserted, it is configured to apply a secondary torque, by elongating the fastener inserted through bore 106.

Figure 6:
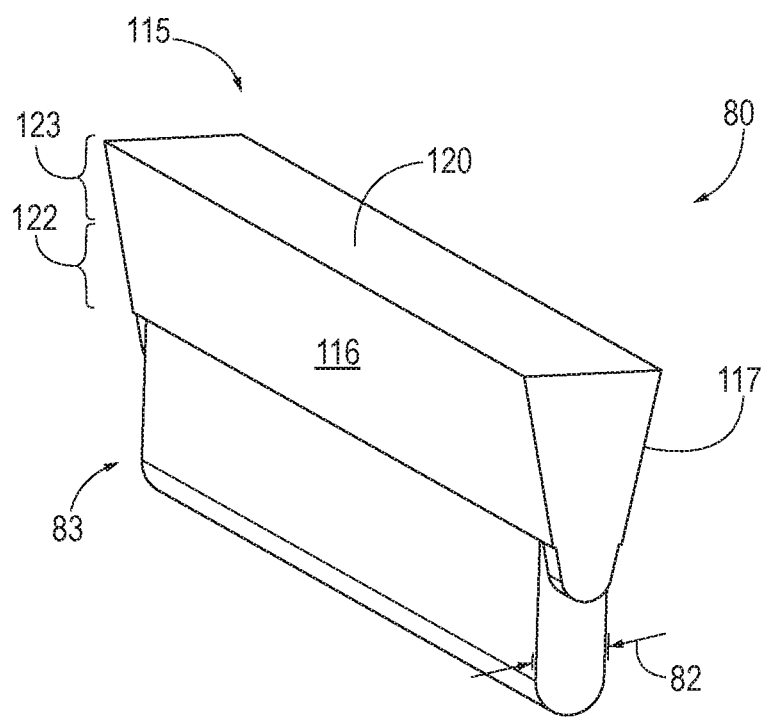
FIG. 6 is a perspective view of one example of a torque nail of a fastener system, according to the present disclosure.

As shown in FIG. 5, first elongated portion 101 is substantially parallel to second elongated portion 102 in some examples of retainer 100. In the example of retainer 100 shown in FIG. 5, first elongated portion 101 is spaced apart from second elongated portion 102 by a distance 107 that is sufficient to accommodate insertion of torque nail 80 into receptacle 70. For example, distance 107 may be at least equal to a width 82 of a lower portion 83 of torque nail 80 (FIG. 6). Distance 107 may be defined by a connecting member 103 that connects first elongated portion 101 to second elongated portion 102. In some examples, connecting member 103 is a perpendicular member 103 that is substantially perpendicular to first elongated portion 101 and second elongated portion 102. Thus, retainer 100 has a rectilinear U-shape in this example, though in other examples, first and second elongated portions 101, 102 may be non-parallel to one another, and/or connecting member 103 may be non-perpendicular to first elongated portion 101 and/or second elongated portion 102.

Figure 7:
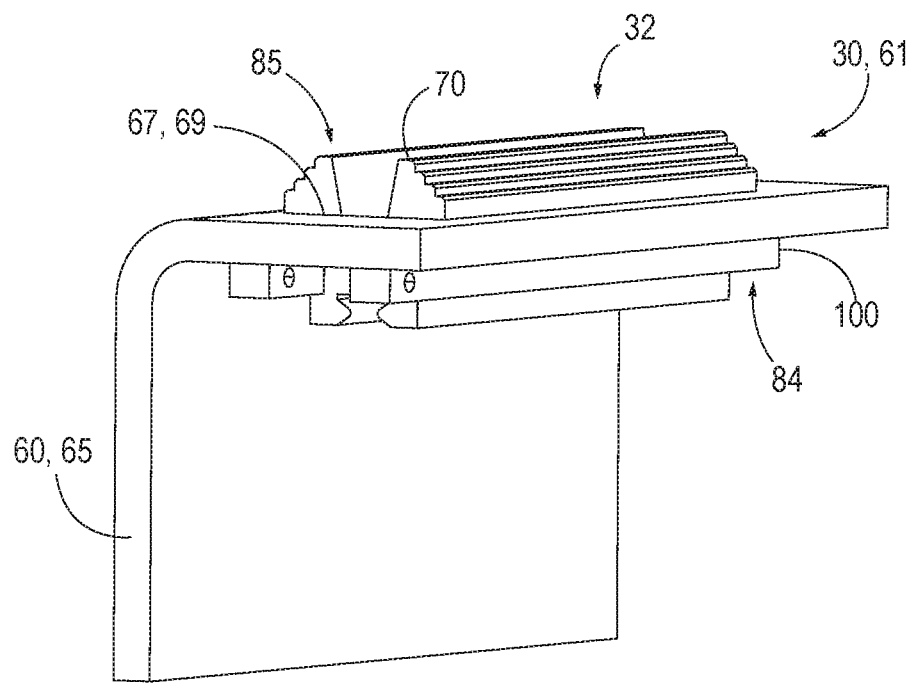
FIG. 7 is a perspective view of one example of a fastener assembly, according to the present disclosure.
Figure 8:
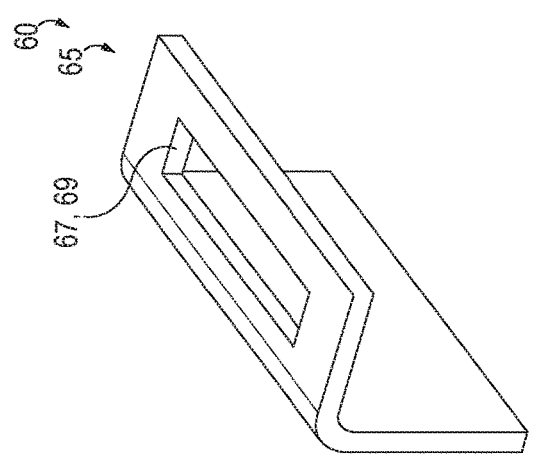
FIG. 8 is a perspective view of one example of a structural connector of a fastener system, according to the present disclosure.

Receptacle 70 is also configured to receive structural connector 60. Retainer 100 and/or structural connector 60 may be coupled to receptacle 70 prior to use by a manufacturer. For example, suppliers may couple retainer 100 and/or structural connector 60 to receptacle 70 and provide the resulting fastener assembly 32 (FIG. 2; FIG. 7) to manufacturers as a kit. As shown in FIG. 7, fastener assembly 32 may include receptacle 70 with retainer 100 and structural connector 60 engaged therewith, coupled thereto, and/or positioned thereon. Retainer 100 engages receptacle 70 as discussed in connection with FIGS. 4 and 5. As shown in FIG. 8, structural connector 60 (shown here in the example of a shear tie 65) may have an elongated curved L-shape, though structural connector 60 may take any suitable shape. In various examples, structural connector 60 may be a shear tie, a fitting, a bracket, an intercostal, and/or any other structural connector configured to engage the part and the composite structure. Regardless of the form of structural connector 60, it generally includes a slotted opening 67, also referred to herein as a slot 67, with slotted opening 67 being configured to receive receptacle 70 therethrough, in order to engage receptacle 70. In examples where structural connector 60 is a shear tie 65, slotted opening 67 may be a shear tie slot 69.

To secure structural connector 60 to receptacle 70, a portion of receptacle 70 may be inserted through slotted opening 67. For example, a lower portion 84 of receptacle 70 may be inserted through slotted opening 67 of structural connector 60 in order to engage structural connector 60 and receptacle 70. In other examples, an upper portion 85 of receptacle 70 (e.g., first elongated grooved surface 71 and second elongated grooved surface 73) may be inserted through slotted opening 67 to engage structural connector 60 and receptacle 70. It may be necessary to compress first elongated grooved surface 71 and second elongated grooved surface 73 closer together via yield regions 77, 77' in order to insert upper portion 85 through slotted opening 67, in some examples. Once structural connector 60 is fully inserted onto receptacle 70, first and second elongated grooved surfaces 71, 73 may snap back, or return to their original, unstressed positions, which may essentially serve to lock structural connector 60 in place, such that it is retained on receptacle 70 by virtue of a width of upper portion 85 being greater than a width of slotted opening 67 of structural connector 60. Retainer 100 may be positioned on receptacle 70 after structural connector 60 is engaged with receptacle 70, or before structural connector 60 is engaged with receptacle 70.

As best seen in FIG. 3, and also with reference to FIG. 4, when structural connector 60 is engaged with receptacle 70, structural connector 60 may be engaged with a first outer wall 86 of receptacle 70, a first lower surface 87 of first elongated grooved surface 71, a second outer wall 88 of receptacle 70, and/or a second lower surface 89 of second elongated grooved surface 73.

Figure 9:
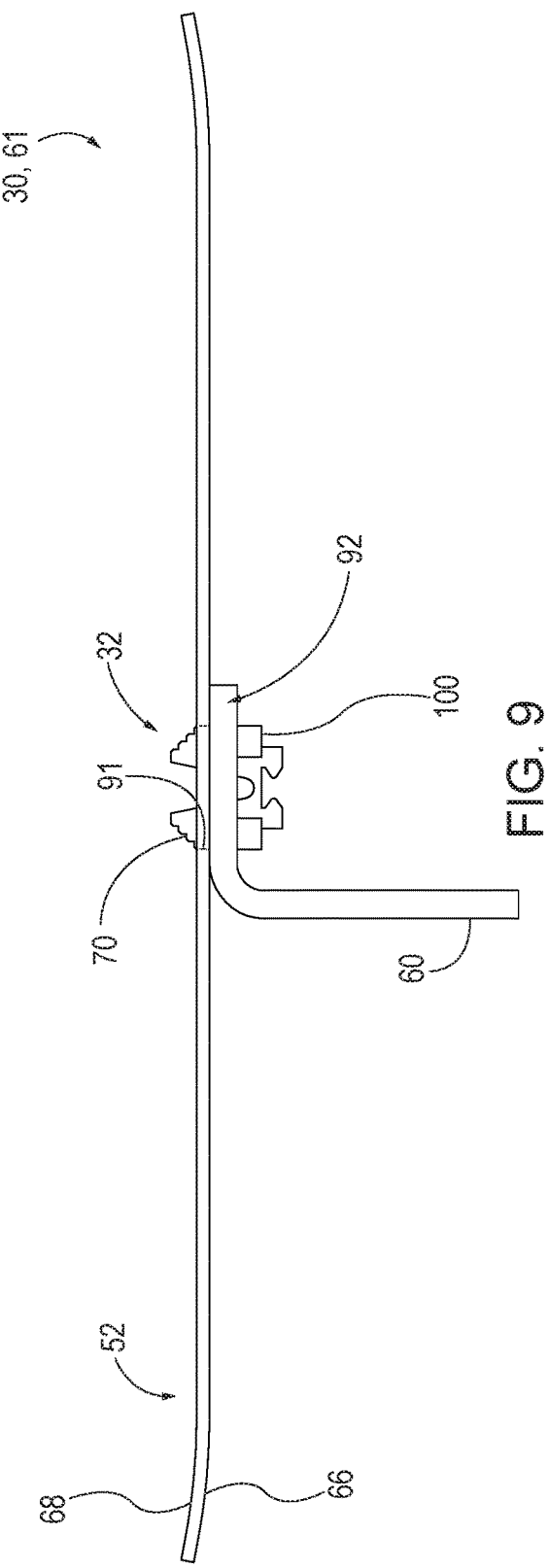
FIG. 9 is a side elevation view of the fastener assembly of FIG. 7, engaged with a first laminate of composite material, according to the present disclosure.

With reference now to FIG. 9, fastener assembly 32 is engaged with first laminate of composite material 52. In some specific examples, first laminate of composite material 52 may be an inner skin for an aircraft, such as an inner skin for an aircraft fuselage. Similar to slotted opening 67 of structural connector 60, first laminate 52 includes a receiving hole 91 through which a portion of receptacle 70 may be inserted, to engage fastener assembly 32 with first laminate 52. Receiving hole 91 generally extends from first inner surface 66 to first outer surface 68 of first laminate 52. As shown in FIG. 9, at least a portion 92 of structural connector 60 is positioned adjacent first laminate 52, such as adjacent first inner surface 66 of first laminate 52, and is said to engage first inner surface 66. In this example, said portion 92 of structural connector 60 is sandwiched between retainer 100 and first inner surface 66 of first laminate 52. Receiving hole 91 of first laminate 52 may be positioned with respect to receptacle 70 such that first laminate 52 engages first elongated grooved surface 71 and second elongated grooved surface 73 of receptacle 70.

Figure 10:
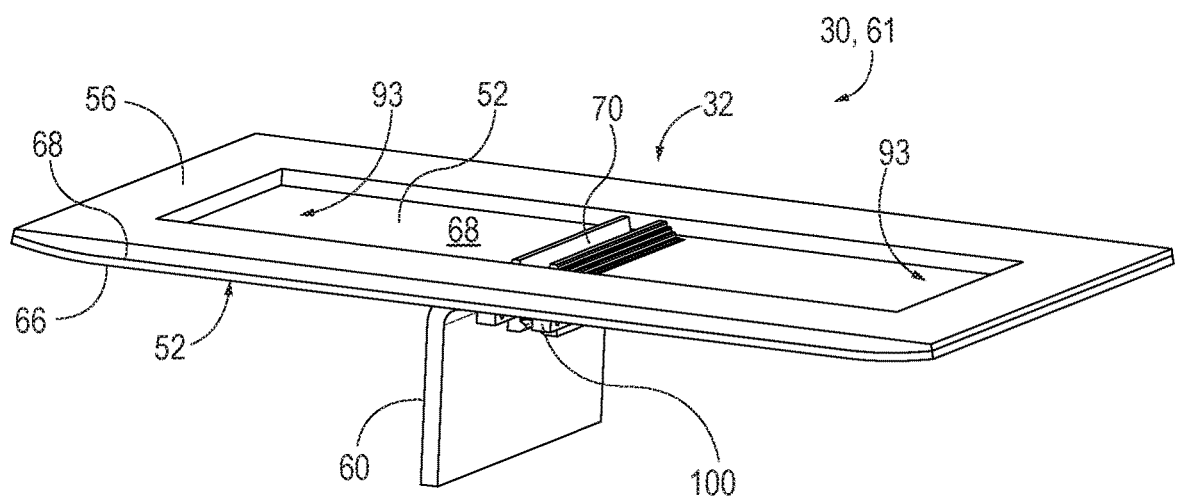
FIG. 10 is a perspective view of the fastener assembly and first laminate of FIG. 9, engaged with a middle laminate of composite material, according to the present disclosure.
Figure 11:
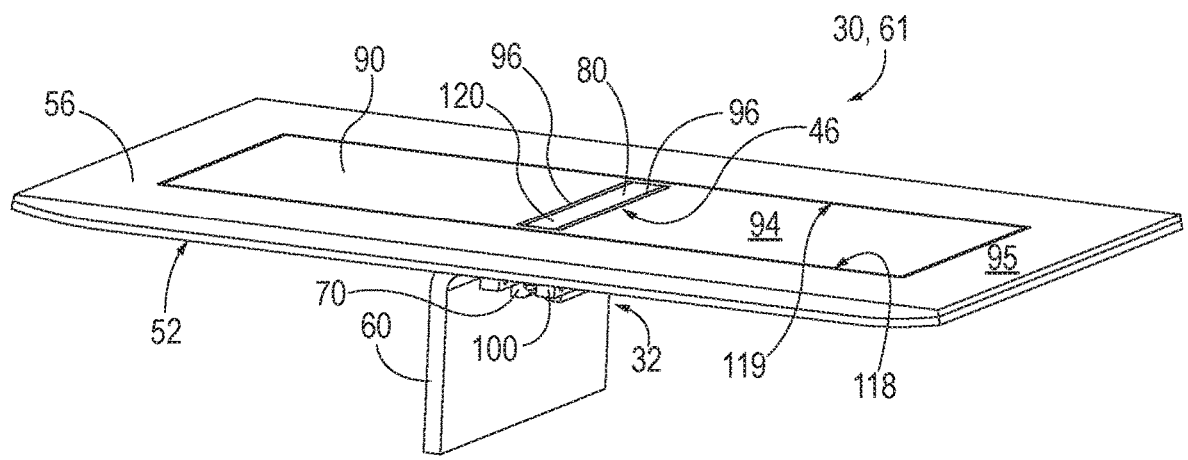
FIG. 11 is a perspective view of the fastener assembly of FIG. 10, showing insertion of an example of a collar plate and torque nail of a fastener system, according to the present disclosure.

As shown in FIG. 10, middle laminate of composite material 56 is applied to first outer surface 68 of first laminate 52. Middle laminate 56 includes a pocket 93, which is configured to receive a portion of fastener assembly 32, as well as collar plate 90, as shown in FIG. 11. Collar plate 90 may be sized and shaped relative to middle laminate 56 and pocket 93 such that when collar plate 90 is positioned within pocket 93, an upper collar plate surface 94 of collar plate 90 is substantially flush with an outer surface 95 of middle laminate 56. For example, plate thickness 59 of collar plate 90 (FIGS. 2, 12) may be substantially equal to laminate thickness 58 of middle laminate 56 (FIG. 2). As best seen in FIG. 11, the size and shape (e.g., surface area) of collar plate 90 may be substantially the same as the size and shape of pocket 93 of middle laminate 56. For example, an outer plate perimeter 118 of collar plate 90 may be substantially the same size and shape as a pocket perimeter 119 of pocket 93, such that collar plate 90 fits securely within pocket 93. In some examples, collar plate 90 may have a slip fit, a friction fit, or a press fit with respect to pocket perimeter 119 of pocket 93. In some examples, a small gap may exist between outer plate perimeter 118 and pocket perimeter 119, when collar plate 90 is inserted into pocket 93. In some examples, such a gap may be filled by filler material and/or resin as collar plate 90 is positioned. In some examples, pocket 93 may be formed around collar plate 90 (e.g., collar plate 90 may be positioned on first laminate 52 before middle laminate 56 is applied).

Figure 12:
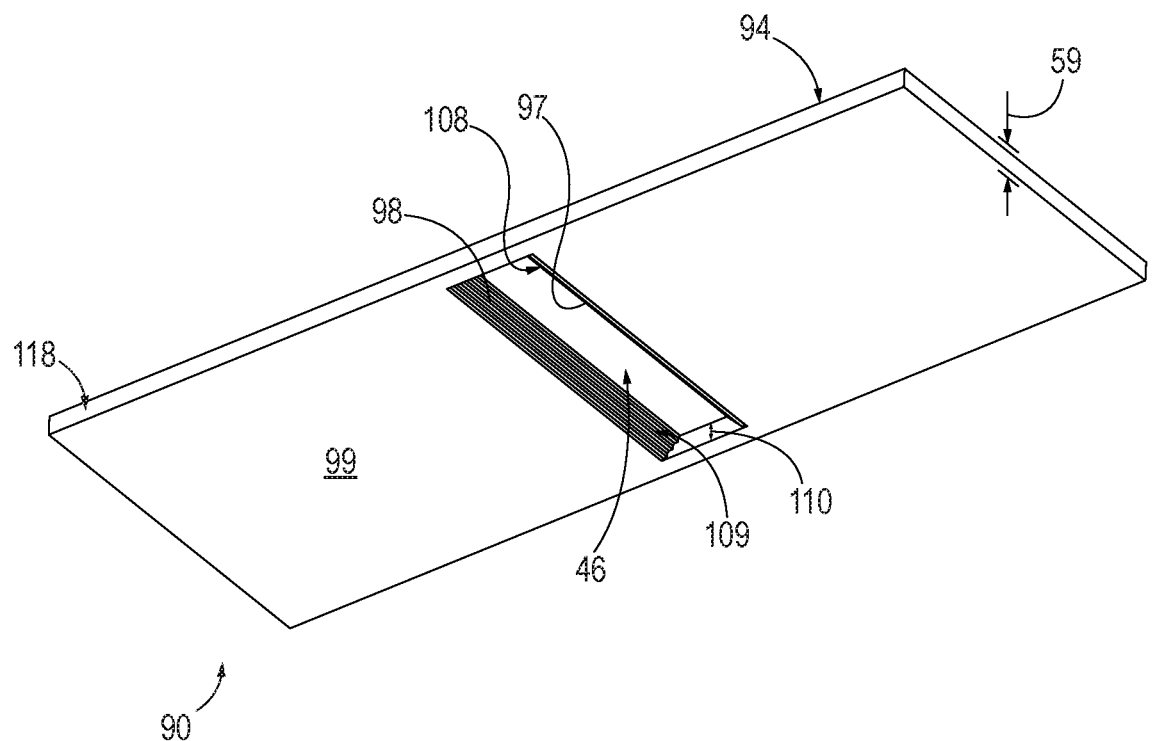
FIG. 12 is a bottom perspective view of an example of a collar plate of a fastener system, according to the present disclosure.

With reference to FIGS. 11 and 12, collar plate 90 includes opening 46 configured to receive receptacle 70 therethrough (though FIG. 12 illustrates collar plate 90 without receptacle 70, for clarity). Thus, collar plate 90 may be engaged with fastener assembly 32 (and fastener system 61) by positioning collar plate 90 within pocket 93 such that first elongated grooved surface 71 and second elongated grooved surface 73 of receptacle 70 are at least partially inserted through opening 46 of collar plate 90. Thus, opening 46 of collar plate 90 may be sized and shaped to fit over first elongated grooved surface 71 and second elongated grooved surface 73 of receptacle 70. It may be necessary to compress first elongated grooved surface 71 and second elongated grooved surface 73 closer together via yield regions 77, 77' in order to insert upper portion 85 of receptacle 70 through opening 46, in some examples. In this manner, yield regions 77, 77' may be configured to allow sufficient movement of receptacle 70 to allow collar plate 90 to be positioned onto receptacle 70. Collar plate thickness 59 (FIG. 12) may be such that upper collar plate surface 94 of collar plate 90 is substantially flush with an upper receptacle surface 96 of receptacle 70 when collar plate 90 is positioned within pocket 93 of fastener system 61.

As shown in FIG. 12, collar plate 90 includes a first plurality of stepped grooves 97 and a second plurality of stepped grooves 98, positioned opposite one another, and partially defining opening 46. As best seen in FIG. 3, when collar plate 90 is engaged with fastener assembly 32, first plurality of stepped grooves 97 is engaged with first plurality of receptacle grooves 72, and second plurality of stepped grooves 98 is engaged with second plurality of receptacle grooves 74. With reference to FIG. 12, first plurality of stepped grooves 97 may be formed on a first angled surface 108 of opening 46, and second plurality of stepped grooves 98 may be formed on a second angled surface 109 of opening 46. In general, first angled surface 108 and second angled surface 109 are non-perpendicular to upper collar plate surface 94 and non-perpendicular to a lower collar plate surface 99 (with lower collar plate surface 99 being opposite upper collar plate surface 94), with opening 46 extending from upper collar plate surface 94 to lower collar plate surface 99. In other words, a height 110 of opening 46 may be equal to collar plate thickness 59. As best seen in FIG. 3, collar plate 90 is generally arranged in fastener system 51 such that a portion of structural connector 60 is engaged with receptacle 70 between retainer 100 and collar plate 90 (first laminate of composite material 52 is also positioned between retainer 100 and collar plate 90, in this example).

With reference to FIGS. 3, 6, and 11, torque nail 80 is positioned within receptacle 70 such that it expands receiving portion 44 of receptacle 70 against collar plate 90. In some examples, first plurality of stepped grooves 97 and second plurality of stepped grooves 98 of collar plate 90 are configured to deform when torque nail 80 is inserted into receiving portion 44 of receptacle 70. Similarly, in some examples, first plurality of receptacle grooves 72 and second plurality of receptacle grooves 74 deform when torque nail 80 is inserted into receptacle 70. Such expansion and deformation of receptacle 70 due to insertion of torque nail 80 thereby may form a locking engagement between receptacle 70 and collar plate 90 (e.g., between the stepped grooves 97, 98 of collar plate 90 and the receptacle grooves 72, 74 of receptacle 70). Collar plate 90 is sized and shaped to distribute loads from torque nail 80 being inserted. For example, collar plate 90 maybe configured to distribute loads within composite structure 43 sufficiently so as to avoid damage to first laminate 52, middle laminate 56, second laminate 54, and/or structural connector 60 when torque nail 80 is inserted into receptacle 70.

Figure 13:
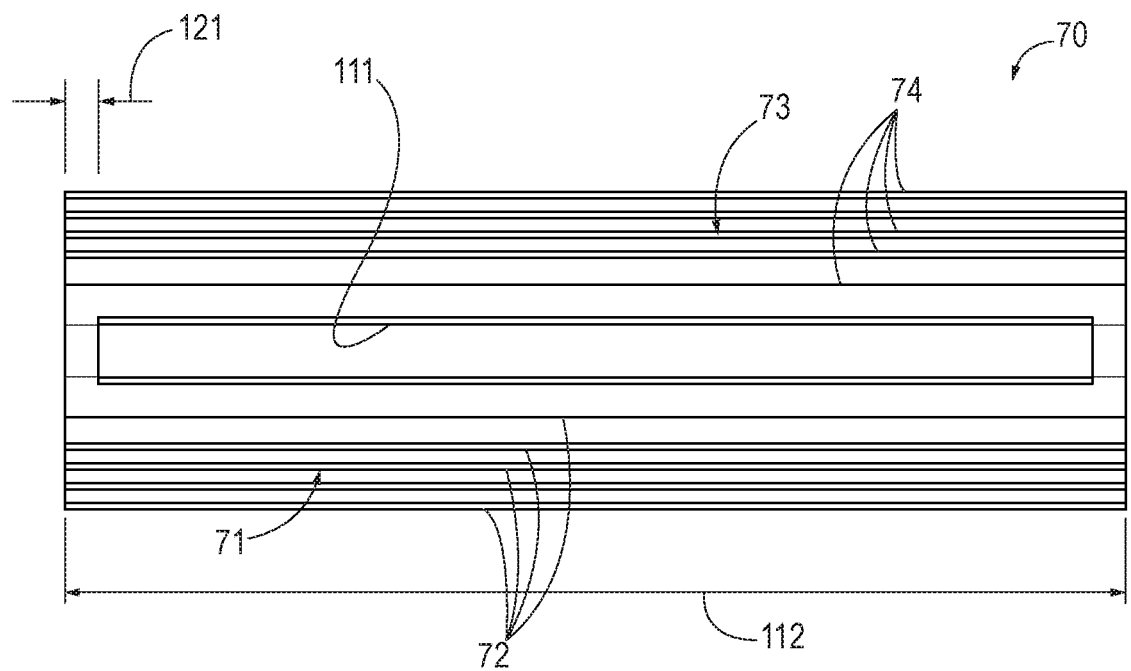
FIG. 13 is a top plan view of an example of a receptacle of a fastener system, according to the present disclosure.

To receive torque nail 80, receptacle 70 includes a slot-shaped opening 111, which is best seen in FIG. 13. Lower portion 83 of torque nail 80 (FIGS. 3 and 6) is inserted through slot-shaped opening 111 when torque nail 80 is inserted into receptacle 70. Slot shaped opening 111 extends between yield region 77 and yield region 77', substantially along an entire length 112 of receptacle 70. When torque nail 80 is fully inserted into receptacle 70, lower portion 83 of torque nail 80 is received between a first pressing surface 113 and a second pressing surface 114 of receptacle 70, best seen in FIGS. 3-4. In some examples, torque nail 80 deforms first pressing surface 113 and second pressing surface 114 as torque nail 80 is inserted into receptacle 70. Additionally or alternatively, lower portion 83 of torque nail 80 may press outwardly on first pressing surface 113 and second pressing surface 114 when torque nail 80 is positioned within receptacle 70. Torque nail 80 may thus be configured to apply forces to both upper portion 85 of receptacle 70 (e.g., first elongated grooved surface 71 and second elongated grooved surface 73) and lower portion 84 of receptacle 70 (e.g., first pressing surface 113 and second pressing surface 114). In some examples, retainer 100 presses inwardly on first pressing surface 113 and second pressing surface 114 when retainer 100 is positioned on receptacle 70.

As best seen in FIG. 6, torque nail 80 includes a wedge-shaped portion 115, which may be coupled to or formed integrally with lower portion 83. Wedge-shaped portion 115 includes a first engagement surface 116 and a second engagement surface 117, which are configured to engage receptacle 70 when torque nail 80 is inserted into receptacle 70. For example, and as best seen in FIG. 3, wedge-shaped portion 115 is configured to be received in receiving portion 44 of receptacle 70 such that first engagement surface 116 engages first inner receiving surface 75 of receptacle 70, and such that second engagement surface 117 engages second inner receiving surface 76 of receptacle 70. First and second engagement surfaces 116, 117 are generally angled, such that torque nail 80 tapers from an upper surface 120 towards lower portion 83. In this manner, torque nail 80 may be configured to press outwardly from within receptacle 70 to a greater extent the farther torque nail 80 is driven into and wherein the slot-shaped opecle 70. Receptacle 70 may be sized relative to torque nail 80 such that receptacle 70 is forced to expand (e.g., by first elongated grooved surface 71 being forced farther apart from second elongated grooved surface 73) as torque nail 80 is inserted, or driven into receptacle 70.

In some examples, at least a portion of first engagement surface 116 is knurled. Additionally or alternatively, at least a portion of second engagement surface 117 may be knurled. As a non-limiting illustrative example, as indicated in FIG. 6, a portion of first engagement surface 116 (and a corresponding portion of second engagement surface 117) indicated by bracket 122 (may be knurled, in some examples, while a portion of first and second engagement surfaces 116, 117 indicated by bracket 123 may be substantially smooth surfaces. Of course, in various examples of torque nail 80, some of all of first and/or second engagement surfaces 116, 117 may be knurled, and/or some or all of first and/or second engagement surfaces 116, 117 may be substantially smooth. In other words, the portions indicated by brackets 122, 123 may be respectively bigger or smaller than indicated in FIG. 6, in various examples. Additionally or alternatively, the relative positions of the portions indicated by brackets 122, 123 may be switched. In some examples, first and second engagement surfaces 116, 117 may include knurled and/or smooth portions spaced apart from one another, such as distributed in discrete locations across first and second engagement surfaces 116, 117.

In some examples, torque nail 80, collar plate 90, and/or receptacle 70 may both be formed of the same material, such as the same metal, polymer, or composite material. In other examples, torque nail 80, collar plate 90, and/or receptacle 70 may be formed of different materials. For example, torque nail 80, collar plate 90, and/or receptacle 70 may be formed of different metals, different polymers, and/or different composite materials. In some examples, torque nail 80 may be formed of a metal and receptacle 70 may be formed of a polymer, or vice versa. The combination of friction, deformation, and/or self-diffusion may serve to join torque nail 80 and receptacle 70. Additionally or alternatively, the combination of friction, deformation, and/or self-diffusion may serve to join collar plate 90 and receptacle 70 together. In examples that at least partially rely on self-diffusion to bond these components, at least a portion of each respective component may be formed of the same material. For example, at least a portion of torque nail 80 may be formed of the same metal as at least a portion of receptacle 70, such that self-diffusion may occur where those respective portions are engaged with one another. Similarly, at least a portion of collar plate 90 may be formed of the same metal as at least a portion of receptacle 70, such that self-diffusion may occur where those respective portions are engaged with one another. In some examples, areas that are configured for self-diffusion may be smoothed to facilitate such self-diffusion. Additionally or alternatively, at least a portion of collar plate 90, torque nail 80, and/or receptacle 70 may be knurled or roughened for frictional engagement with other respective surface.

Figure 14:
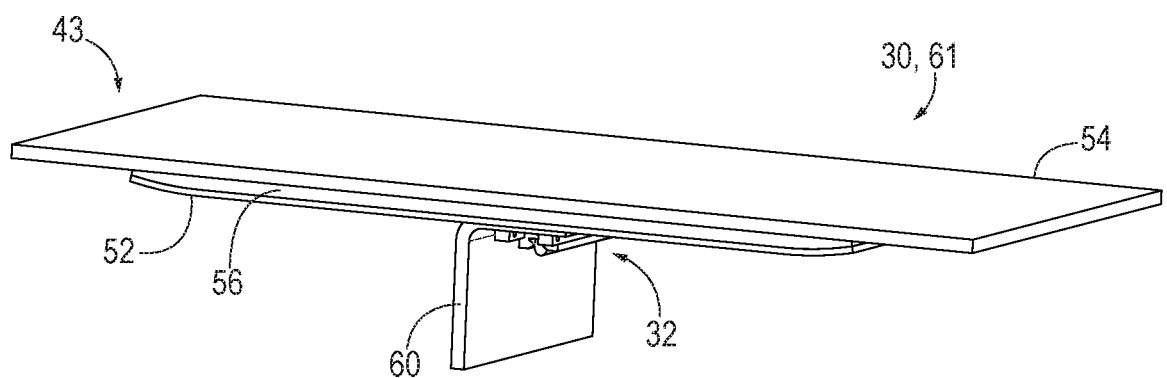
FIG. 14 is a perspective view of the fastener assembly of FIG. 11, showing application of a second laminate of composite material, according to the present disclosure.

Once torque nail 80 and collar plate 90 are positioned as shown in FIG. 11, second laminate of composite material 54 may be applied, thereby enclosing collar plate 90 between first laminate 52 and second laminate 54, as shown in FIG. 14. Second laminate 54 may be applied to upper collar plate surface 94 and outer surface 95 of middle laminate 56, such that a portion of torque nail 80 and receptacle 70 are enclosed within composite structure 43. In a specific example, composite structure 43 may be an aircraft fuselage, with first laminate 52 being the inner skin for the fuselage, and second laminate 54 being the outer skin for the fuselage. Fastener system 61 may thus be used to secure a part to composite structure 43 without requiring the drilling of holes through first laminate 52 and second laminate 54. Such parts may include, for example, a frame for an aircraft fuselage, a fitting, and/or a bracket, and may be secured directly to composite structure 43 via fastener system 61, or may be secured to composite structure 43 by way of structural connector 60.

Figure 15:
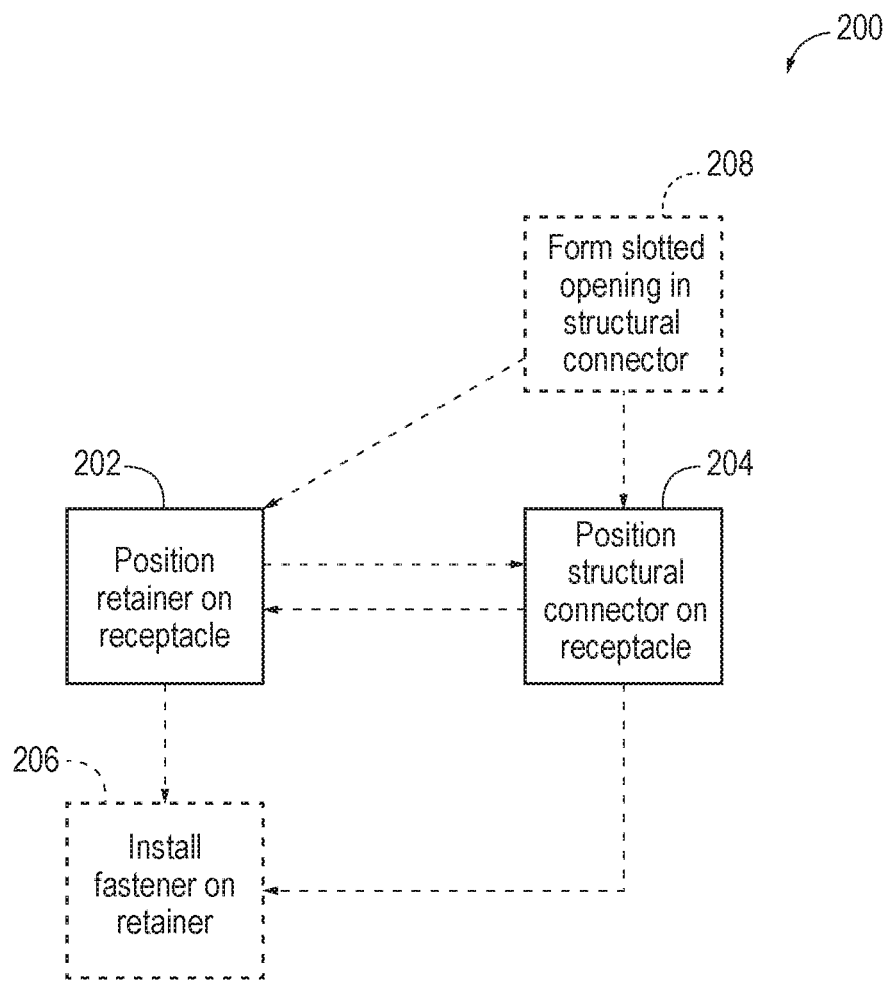
FIG. 15 is a schematic flowchart diagram of methods of assembling a fastener assembly according to the present disclosure.
Figure 16:
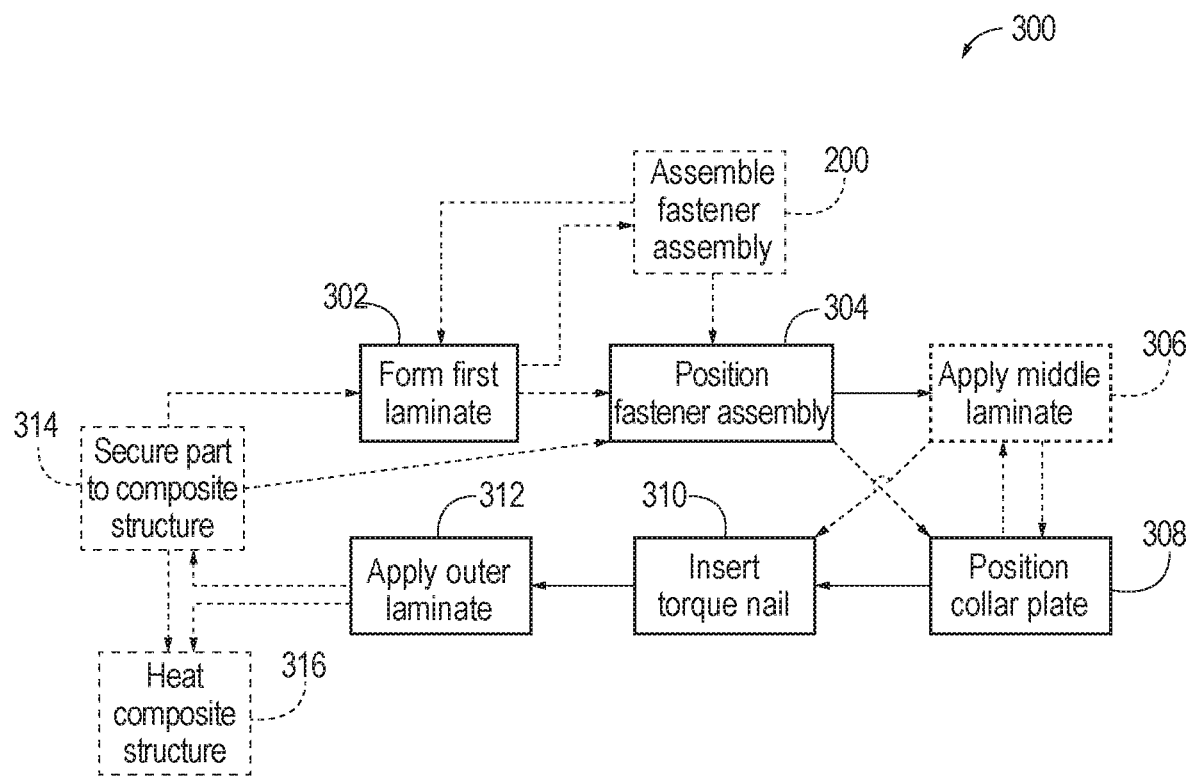
FIG. 16 is a schematic flowchart diagram of methods of installing a fastener system for coupling a part to a composite structure, according to the present disclosure.

FIGS. 15-16 schematically provide flowcharts that represent illustrative, non-exclusive examples of methods according to the present disclosure. In FIGS. 15-16, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 15-16 are not limiting and other methods and steps are within the scope of the present disclosure, including methods having greater than or fewer than the number of steps illustrated, as understood from the discussions herein.

FIG. 15 illustrates methods 200 of assembling a fastener assembly (e.g., fastener assembly 32) to a composite structure (e.g., composite structure 42). Methods 200 generally include positioning a retainer of the fastener assembly (e.g., retainer 100) on a receptacle of the fastener assembly (e.g., receptacle 34), at 202. Methods 200 further include positioning a structural connector of the fastener assembly (e.g., structural connector 60) on the receptacle, at 204, with the fastener assembly being configured to couple a part to the composite structure, via the structural connector. Positioning the structural connector on the receptacle at 204 may include compressing and/or plastically deforming a portion of the receptacle, such as the first and second elongated grooved surfaces 71, 73 of receptacle 70. In some examples, positioning the structural connector at 204 also includes allowing the portion of the receptacle to return to its unstressed state, thereby securing the structural connector on the receptacle.

In some specific examples, positioning the retainer at 202 includes sliding the retainer into a first retainer-receiving recess (e.g., first retainer-receiving recess 78) and a second retainer-receiving recess (e.g., second retainer-receiving recess 79) of the receptacle. Some methods 200 include installing at least one fastener on the retainer at 206, thereby tightening and/or securing the retainer around the receptacle. In some examples, the positioning the retainer at 202 is performed after the positioning the structural connector at 204. In other examples, the positioning the retainer at 202 is performed before the positioning the structural connector at 204. Positioning the structural connector at 204 may include contacting the retainer with the structural connector, in some examples.

Some methods 200 include forming a slotted opening in the structural connector (e.g., slotted opening 67) at 208, with the forming the slotted opening being performed at 208 before positioning the structural connector on the receptacle at 204. The forming the slotted opening at 208 generally includes forming a slotted opening that is sized and shaped to be fitted over a portion of the receptacle (e.g., upper portion 85 or lower portion 84) to secure the structural connector to the receptacle. In some examples, methods 200 may be performed prior to and/or at a location remote from installing the fastener system in the composite structure. For example, methods 200 may be performed by a supplier to provide a fastener assembly for use by a manufacturer. In other examples, methods 200 may be performed substantially concurrently with and/or in the same location as other steps of installing presently disclosed fastener systems.

FIG. 16 illustrates methods 300 of installing presently disclosed fastener systems (e.g., fastener systems 30). Such fastener systems may be used to couple a part to a composite structure, such as to couple a frame to an aircraft fuselage skin, without requiring holes to be drilled through the skin for such securement. Methods 300 generally include forming a first laminate of composite material (e.g., first laminate 52) having a receiving hole (e.g., receiving hole 91) formed therethrough, at 302, and positioning a fastener assembly (e.g., fastener assembly 32) with respect to the first laminate of composite material, at 304, such that the receptacle (e.g., receptacle 70) of the fastener assembly is at least partially inserted through the receiving hole of the first laminate, and such that the first laminate engages a structural connector of the fastener assembly (e.g., structural connector 60). Positioning the fastener assembly at 304 may be performed, in some examples, by accessing the first laminate via the inner surface of the first laminate, corresponding to an interior region of the composite structure. In some methods 300, the fastener assembly is assembled at 200, such as by performing any of methods 200 as detailed above in connection with FIG. 15, prior to positioning the fastener assembly 304. Assembling the fastener assembly at 200 may also include selecting a thickness of yield regions of the receptacle (e.g., thickness 121 of yield regions 77, 77') such that the yield regions are sufficiently compliant to allow insertion of the torque nail and/or the collar plate of the fastener system.

In some specific examples, positioning the fastener assembly at 304 may include positioning the fastener assembly such that a portion of the structural connector is positioned between the first laminate of composite material and a retainer (e.g., retainer 100) of the fastener assembly. Once the fastener assembly is positioned with respect to the first laminate at 304, a middle laminate of composite material (e.g., middle laminate 56) is applied, at 306. Middle laminate is applied at 306 to the first laminate, and generally to the first outer surface (e.g., first outer surface 68) of the first laminate. Middle laminate may be applied 306 by being secured to the first laminate, being adhered to the middle laminate, and/or being laid up directly on the first laminate. Applying the middle laminate at 306 includes applying the layers of material that form the middle laminate such that a pocket is formed in the middle laminate (e.g., pocket 93), with the pocket being configured to receive at least a portion of the receptacle of the fastener assembly therethrough. The pocket is also configured to receive a collar plate (e.g., collar plate 90) of the fastener system. The pocket may be formed as the middle laminate is formed, such as by laying up layers of material with an opening preformed therein, such that the respective preformed openings of the respective layers are aligned as the middle laminate is formed, to form the pocket in the middle laminate. In other examples, the pocket may be formed after the layers of the middle laminate are laid up, such as by cutting the pocket in the middle laminate. In yet other examples, applying the middle laminate at 306 may be performed by laying layers of material around the collar plate, such that the pocket is formed around the collar plate after the collar plate is positioned on the first laminate.

Once the fastener assembly is positioned at 304, the collar plate may be positioned at 308 by placing the collar plate on the receptacle, such that a portion of the receptacle is inserted through a slotted opening (e.g., opening 46) formed in the collar plate. For example, the first and second elongated grooved surfaces (71, 73) of the receptacle may be inserted through the opening in the collar plate as the collar plate is positioned. When positioning the collar plate 308, a lower plate surface of the collar plate (e.g., lower collar plate surface 99) is engaged with the first upper surface of the first laminate (e.g., first outer surface 68). In some methods 300, the middle laminate is applied at 306 before the collar plate of the fastener system is positioned at 308, with the collar plate being positioned within the pocket of the middle laminate. In some methods 300, the collar plate is positioned at 308 before the middle laminate is applied at 306, such that the pocket of the middle laminate is formed around the collar plate.

Positioning the collar plate at 308 may include locking the collar plate and the receptacle together by engaging a first plurality of stepped grooves of the collar plate (e.g., first plurality of stepped grooves 97) with a first plurality of receptacle grooves of the receptacle (e.g., first plurality of receptacle grooves 72). Similarly, a second plurality of stepped grooves of the collar plate (e.g., second plurality of stepped grooves 98) may be engaged with a second plurality of receptacle grooves of the receptacle (e.g., second plurality of receptacle grooves 74). As the collar plate is so engaged with the receptacle, the stepped grooves of the collar plate and/or the receptacle grooves of the receptacle may be deformed by the pressure of the collar plate on the receptacle, which may serve to lock the two structures together. Additionally or alternatively, the collar plate and receptacle may be configured such that self-diffusion occurs between them to join the collar plate and the receptacle together. Generally, when the collar plate is positioned at 308, it is placed slowly enough to limit and/or substantially avoid uneven disruption of resin within the first laminate of composite material under the collar plate.

Methods 300 also include inserting a torque nail (e.g., torque nail 80) of the fastener system into the receptacle, at 310. In some examples, inserting the torque nail at 310 expands the receptacle, by virtue of the torque nail pressing outwardly against the receiving surfaces of the receptacle. Inserting the torque nail at 310 may include driving the torque nail into the receptacle such that the torque nail causes deformation torque in the receptacle. Additionally or alternatively, inserting the torque nail at 310 may cause deformation torque in the retainer and/or in the collar plate of the fastener system. The torque nail may be inserted at 310 from an outer side of the fastener system, such as from an outer surface of the first laminate of composite material (e.g., first outer surface 68). Various steps of methods 300, such as positioning the fastener assembly at 304, positioning the collar plate at 308, and/or inserting the torque nail at 310 may include cleaning and/or smoothing one or more surfaces of the fastener system to an extent sufficient to facilitate self-diffusion between the corresponding engaged surfaces. For example, such steps may include cleaning and/or smoothing the first engagement surface of the torque nail, the second engagement surface of the torque nail, the first inner receiving surface of the receptacle, and/or the second inner receiving surface of the receptacle.

Once the collar plate is positioned at 308 and the torque nail is inserted at 310, an outer laminate of composite material (e.g., second laminate 54) may be applied, at 312. The outer laminate is generally applied at 312 such that the outer laminate covers the collar plate of the fastener system, thereby enclosing, or embedding, the collar plate between the outer laminate of composite material and the inner laminate of composite material. Applying the outer laminate at 312 may also include covering at least a portion of the middle laminate with the outer laminate. In some methods, the entire middle laminate may be covered by the outer laminate, whereas in other examples, some of the middle laminate may extend beyond the edges of the outer laminate. In some methods, the collar plate may be enclosed between just an inner and outer laminate of composite material, without further including the middle laminate.

Some methods 300 include securing a part to the composite structure, at 314 (with the composite structure being composed of the first laminate, the middle laminate, and/or the outer laminate of composite material). For example, securing the part to the composite structure at 314 may include securing the part to the structural connector of the fastener system, which may be performed before positioning the fastener assembly at 304, or at any other stage of method 300, such as after applying the outer laminate at 312. In some examples, securing the part to the composite structure at 314 may be performed before applying the outer laminate at 312 and/or before applying the middle laminate at 306. In some methods 300, securing the part to the composite structure at 314 includes holding the part in place with tooling until after applying the outer laminate at 312. Securing the part to the composite structure at 314 may include coupling the part to the structural connector from the interior region of the composite structure, such as by accessing the structural connector adjacent the first inner surface of the first laminate of composite material. The outer laminate of composite material applied at 312 may then form the exterior region of the composite structure. In this manner, methods 300 generally involve coupling the part to the composite structure at the time the laminates (e.g., aircraft skin) is applied.

Methods 300 may include heating the composite structure, along with the fastener system and part coupled thereto, at 316. Such heating at 316 may be performed to cure the inner laminate of composite material, the middle laminate of composite material, and/or the outer laminate of composite material. In some examples, heating the composite structure at 316 may result in relaxing the part, due to the part (or parts) already being installed in or on the composite structure prior to curing the composite structure. In one specific example, heating the composite structure at 316 includes positioning the composite structure (and any parts coupled thereto via one or more presently disclosed fastener systems) in an oven or autoclave, and heating the composite structure to a temperature sufficient to cure the composite structure. For example, the heating the composite structure at 316 may include heating the composite structure to a temperature of at least 100° F., at least 150° F., at least 200° F., at least 250° F., at least 300° F., at least 350° F., at least 400° F., at least 450° F., at least 500° F., at least 550° F., and/or at least 600° F., for a period of time sufficient to cure the laminates (e.g., panel skins) of the composite structure. Some or all steps of methods 300 may be automated, in some examples. For example, once one or more fastener assemblies are positioned with respect to the composite structure at 304, one or more parts may be secured to the composite structure at 314 using automated techniques.

Illustrative, non-exclusive examples of inventive subject matter according to the present disclosure are described in the following enumerated paragraphs:

A1. A fastener system for coupling a part to a composite structure, the fastener system comprising:

a receptacle configured to be embedded at least partially within the composite structure;

a torque nail configured to be received at least partially within the receptacle, wherein the torque nail is sized and shaped with respect to the receptacle such that it expands a receiving portion of the receptacle when pressed into the receiving portion; and a collar plate configured to be embedded within the composite structure and configured to distribute forces from the torque nail being pressed into the receiving portion, wherein the fastener system is configured to engage the part and the composite structure such that it couples the part to the composite structure.

A2. The fastener system of paragraph A1, wherein the collar plate comprises an opening configured to receive the receptacle therethrough.

A3. The fastener system of any of paragraphs A1-A2, wherein the torque nail is configured to expand the receiving portion of the receptacle against the collar plate when the torque nail is inserted into the receiving portion of the receptacle.

A4. The fastener system of any of paragraphs A1-A3, wherein the opening of the collar plate comprises a first plurality of stepped grooves and a second plurality of stepped grooves, wherein the first plurality of stepped grooves is positioned opposite the second plurality of stepped grooves.

A5. The fastener system of paragraph A4, wherein the first plurality of stepped grooves and the second plurality of stepped grooves are configured to plastically deform when the torque nail is inserted into the receiving portion of the receptacle.

A6. The fastener system of any of paragraphs A1-A5, wherein the collar plate comprises a lower collar plate surface and an upper collar plate surface, wherein the upper collar plate surface is opposite the lower collar plate surface, wherein the opening extends from the upper collar plate surface to the lower collar plate surface such that the opening has a height that is equal to a thickness of the collar plate.

A7. The fastener system of any of paragraphs A1-A6, wherein a/the first plurality of stepped grooves of the collar plate are configured to engage a first plurality of receptacle grooves of the receptacle, and wherein a/the second plurality of stepped grooves of the collar plate are configured to engage a second plurality of receptacle grooves of the receptacle.

A8. The fastener system of any of paragraphs A1-A7, wherein a/the first plurality of stepped grooves of the collar plate are formed on a first angled surface of the opening of the collar plate, wherein the first angled surface is non-perpendicular to an/the upper collar plate surface of the collar plate and a/the lower collar plate surface of the collar plate, wherein a/the second plurality of stepped grooves of the collar plate are formed on a second angled surface of the opening of the collar plate, wherein the second angled surface is non-perpendicular to the upper collar plate surface and the lower collar plate surface.

A9. The fastener system of any of paragraphs A1-A8, wherein the collar plate is sized and shaped to distribute the loads within the composite structure sufficiently so as to avoid damage to the part when the torque nail is inserted into the receptacle.

A10. The fastener system of any of paragraphs A1-A9, wherein the opening of the collar plate is sized and shaped to fit over a first elongated grooved surface of the receptacle and a second elongated grooved surface of the receptacle.

A11. The fastener system of any of paragraphs A1-A10, wherein the receptacle comprises a/the first plurality of receptacle grooves and a/the second plurality of receptacle grooves, wherein the first plurality of receptacle grooves and the second plurality of receptacle grooves are configured to engage the collar plate.

A12. The fastener system of any of paragraphs A1-A11, wherein the receptacle is configured to expand such that it deforms a/the first plurality of stepped grooves of the collar plate, a/the second plurality of stepped grooves of the collar plate, a/the first plurality of receptacle grooves of the receptacle, and/or a/the second plurality of receptacle grooves of the receptacle, when the torque nail is inserted into the receptacle.

A13. The fastener system of any of paragraphs A1-A12, wherein expansion and deformation of the receptacle via insertion of the torque nail forms a locking engagement between the receptacle and the collar plate.

A14. The fastener system of any of paragraphs A1-A13, wherein the receptacle comprises a yield region configured to allow movement of the receptacle sufficient to allow the collar plate to be positioned onto the receptacle.

A15. The fastener system of any of paragraphs A1-A14, wherein the receptacle comprises:
a/the first elongated grooved surface including a/the first plurality of receptacle grooves;
a/the second elongated grooved surface including a/the second plurality of receptacle grooves;
the receiving portion for receiving the torque nail, wherein the receiving portion is defined by a first inner receiving surface and a second inner receiving surface;
a/the yield region positioned between the first inner receiving surface and the second inner receiving surface, wherein the yield region is configured to bend and/or compress, such that the first elongated grooved surface and the second elongated grooved surface can be forced closer together when the collar plate is inserted onto the receptacle, and wherein the yield region is configured to allow expansion of the receiving portion such that the first elongated grooved surface and the second elongated grooved surfaces are moved farther apart from one another when the torque nail is inserted into the receiving portion.

A16. The fastener system of paragraph A15, wherein at least a portion of the first inner receiving surface is knurled.

A17. The fastener system of any of paragraphs A15-A16, wherein at least a portion of the second inner receiving surface is knurled.

A18. The fastener system of any of paragraphs A15-A17, wherein at least a portion of the first inner receiving surface is smooth.

A19. The fastener system of any of paragraphs A15-A18, wherein at least a portion of the second inner receiving surface is smooth.

A20. The fastener system of any of paragraphs A1-A19, wherein the receptacle further comprises a first retainer-receiving recess and a second retainer-receiving recess, positioned opposite one another, wherein the receptacle is configured to receive a retainer of the fastener system in the first retainer-receiving recess and the second retainer-receiving recess.

A21. The fastener system of any of paragraphs A1-A20, wherein the receptacle further comprises a slot-shaped opening through which a lower portion of the torque nail is configured to be inserted.

A22. The fastener system of paragraph A21, wherein the slot-shaped opening extends between a/the yield region and a second yield region.

A23. The fastener system of any of paragraphs A1-A22, wherein the receptacle further comprises a first pressing surface and a second pressing surface, wherein the receptacle is configured to receive a/the lower portion of the torque nail between the first pressing surface and the second pressing surface when the torque nail is positioned within the receptacle.

A24. The fastening system of paragraph A23, wherein the lower portion of the torque nail presses outward on the first pressing surface and the second pressing surface when the torque nail is positioned within the receptacle.

A25. The fastener system of any of paragraphs A23-A24, wherein a/the retainer of the fastening system presses inward on the first pressing surface and the second pressing surface when the retainer is positioned on the receptacle.

A26. The fastener system of any of paragraphs A1-A25, wherein the torque nail is configured to apply forces to an upper portion of the receptacle and to a lower portion of the receptacle.

A27. The fastener system of paragraph A26, wherein the upper portion of the receptacle comprises a/the first elongated grooved surface and a/the second elongated grooved surface, and wherein the lower portion of the receptacle comprises a/the first pressing surface and a/the second pressing surface.

A28. The fastener system of any of paragraphs A1-A27, wherein the torque nail comprises a wedge-shaped portion having a first engagement surface and a second engagement surface, wherein the first engagement surface and the second engagement surface are configured to engage the receptacle when the torque nail is positioned within the receptacle.

A29. The fastener system of paragraph A28, wherein at least a portion of the first engagement surface is knurled and/or wherein at least a portion of the second engagement surface is knurled.

A30. The fastener system of paragraph A28 or A29, wherein the wedge-shaped portion is configured to be received in the receiving portion of the receptacle such that the first engagement surface engages a/the first inner receiving surface of the receptacle and such that the second engagement surface engages a/the second inner receiving surface of the receptacle.

A31. The fastener system of any of paragraphs A1-A30, wherein the torque nail comprises a/the lower portion integrally formed with the wedge-shaped portion.

A32. The fastener system of any of paragraphs A1-A31, wherein a/the lower portion of the torque nail is configured to extend through a/the slot-shaped opening formed in the receptacle such that the lower portion is pinched by a/the first pressing surface and a/the second pressing surface of the receptacle.

A33. The fastener system of any of paragraphs A1-A32, wherein the fastener system comprises a/the retainer.

A34. The fastener system of paragraph A33, wherein the retainer is configured to have a slip fit with a/the first retainer-receiving recess of the receptacle and a/the second retainer-receiving recess of the receptacle.

A34.1. The fastener system of paragraph A33 or A34, wherein the retainer is configured to constrain the receptacle.

A34.2. The fastener system of any of paragraphs A33-A34.1, wherein the retainer is configured to constrain the receptacle about the torque nail.

A35. The fastener system of any of paragraphs A34-A34.2, wherein the retainer comprises a first elongated portion configured to engage the first retainer-receiving recess.

A36. The fastener system of paragraph A35, wherein the retainer comprises a second elongated portion configured to engage the second retainer-receiving recess.

A37. The fastener system of paragraph A36, wherein the first elongated portion is substantially parallel to the second elongated portion.

A38. The fastener system of paragraph A36 or A37, wherein the first elongated portion is spaced apart from the second elongated portion by a distance that is at least equal to, and optionally greater than, a width of a/the lower portion of the torque nail.

A39. The fastener system of any of paragraphs A36-A38, wherein the retainer comprises a perpendicular member that connects the first elongated portion to the second elongated portion, wherein the perpendicular member is substantially perpendicular to the first elongated portion and/or to the second elongated portion, such that the retainer forms a rectilinear U-shape.

A40. The fastener system of any of paragraphs A34-A39, wherein the retainer comprises at least one fastener that extends through a/the first elongated portion and a/the second elongated portion, wherein the at least one fastener is configured to tighten the retainer around the receptacle once the retainer is positioned on the receptacle.

A41. The fastener system of paragraph A40, wherein the at least one fastener is configured to elongate when the torque nail presses outwardly on the receptacle.

A42. The fastener system of any of paragraphs A1-A41, wherein the receptacle is further configured to receive a structural connector.

A42.1. The fastener system of paragraph A41, wherein the structural connector comprises a shear tie, a fitting, a bracket, an intercostal, and/or any other structural connector configured to engage the part and the composite structure.

A43. The fastener system of any of paragraphs A1-A42, further comprising a/the structural connector, wherein the structural connector is configured to engage the receptacle.

A44. The fastener system of paragraph A43, wherein the structural connector comprises a slot configured to receive the receptacle therethrough.

A44.1. The fastener system of paragraph A43 or A44, wherein the structural connector comprises a/the shear tie, and wherein the slot comprises a shear tie slot configured to receive the receptacle therethrough.

A45. The fastener system of any of paragraphs A42-A44.1, wherein the structural connector is configured to engage the receptacle such that at least a portion of the structural connector is engaged with the receptacle between a/the retainer and the collar plate.

A46. The fastener system of any of paragraphs A42-A45, wherein the receptacle comprises a first outer wall and a second outer wall, and wherein the structural connector contacts the first outer wall and the second outer wall when the structural connector is secured to the receptacle.

A47. The fastener system of any of paragraphs A1-A46, wherein the torque nail and the receptacle are both formed of a first metal.

A48. The fastener system of any of paragraphs A1-A47, wherein the part comprises a frame, a fitting, and/or a bracket.

A49. The fastener system of any of paragraphs A1-A48, wherein the composite structure comprises a carbon fiber skin of an aircraft fuselage.

A50. The fastener system of any of paragraphs A1-A49, wherein the fastener system directly couples the part to the composite structure.

A51. The fastener system of any of paragraphs A1-A50, wherein the fastener system couples the part to the composite structure via a/the structural connector.

A52. The fastener system of any of paragraphs A1-A51, wherein the torque nail and the receptacle are joined together via self-diffusion, friction connection, and/or deformation.

A53. The fastener system of any of paragraphs A1-A52, wherein the collar plate and the receptacle are joined together via self-diffusion, friction connection, and/or deformation.

B1. An assembly, comprising:
a fastener system for coupling a part to a composite structure, wherein the fastener system is the fastener system of any of paragraphs A1-A53;
a first laminate of composite material; and
a second laminate of composite material, wherein the collar plate of the fastener system is positioned between the first laminate of composite material and the second laminate of composite material.

B2. The assembly of paragraph B1, further comprising a/the structural connector, at least a portion of which is positioned adjacent the first laminate of composite material.

B3. The assembly of paragraph B2, further comprising a/the retainer of the fastener system, wherein the portion of the structural connector is sandwiched between the retainer and an inner surface of the first laminate of composite material.

B4. The assembly of any of paragraphs B1-B3, wherein the first laminate of composite material comprises an outer surface opposite an/the inner surface, wherein the first laminate of composite material is oriented such that the outer surface faces the second laminate of composite material.

B5. The assembly of any of paragraphs B1-B4, wherein the first laminate of composite material and/or the second laminate of composite material comprises polymer-reinforced carbon fiber.

B6. The assembly of any of paragraphs B1-B5, wherein the second laminate of composite material is an outer skin for an aircraft fuselage.

B7. The assembly of any of paragraphs B1-B6, wherein the first laminate of composite material is an inner skin for an aircraft fuselage.

B8. The assembly of any of paragraphs B1-B7, further comprising a middle laminate of composite material positioned between the first laminate of composite material and the second laminate of composite material.

B9. The assembly of paragraph B8, wherein the middle laminate of composite material has a laminate thickness that is substantially equal to a plate thickness of the collar plate.

B10. The assembly of any of paragraphs B1-B9, wherein the first laminate of composite material comprises a first plurality of layers of composite material.

B11. The assembly of any of paragraphs B1-B10, wherein the second laminate of composite material comprises a second plurality of layers of composite material.

B12. The assembly of any of paragraphs B1-B11, wherein a/the middle laminate of composite material comprises a third plurality of layers of composite material.

B13. The assembly of any of paragraphs B1-B12, wherein the first laminate of composite material, the second laminate of composite material, and/or a/the middle laminate of composite material together form the composite structure.

C1. A method of assembling a fastener assembly for coupling a part to a composite structure, the method comprising:
positioning a retainer of the fastener assembly on a receptacle of the fastener assembly; and
positioning a structural connector of the fastener assembly on the receptacle, wherein the fastener assembly is configured to couple the part to the composite structure, via the structural connector.

C2. The method of paragraph C1, wherein the fastener assembly is the fastener system of any of paragraphs A1-A53.

C3. The method of any of paragraphs C1-C2, wherein the positioning the retainer comprises sliding the retainer into a/the first retainer-receiving recess of the receptacle and into a/the second retainer-receiving recess of the receptacle.

C4. The method of any of paragraphs C1-C3, wherein the positioning the retainer comprises installing at least one fastener on the retainer, thereby tightening and/or securing the retainer around the receptacle.

C5. The method of any of paragraphs C1-C4, wherein the positioning the retainer is performed after the positioning the structural connector.

C6. The method of any of paragraphs C1-05, further comprising forming a slotted opening in the structural connector, wherein the slotted opening is sized and shaped to be fitted over a portion of the receptacle to secure the structural connector to the receptacle.

C7. The method of any of paragraphs C1-C6, wherein the positioning the structural connector comprises compressing and plastically deforming a portion of the receptacle.

C8. The method of paragraph C7, wherein the positioning the structural connector comprises allowing the portion of the receptacle to return to its unstressed state, thereby securing the structural connector on the receptacle.

C9. The method of any of paragraphs C1-C8, wherein the positioning the structural connector comprises contacting the retainer with the structural connector.

D1. A method of installing a fastener system for coupling a part to a composite structure, the method comprising:
positioning a fastener assembly with respect to an inner laminate of composite material such that a receptacle of the fastener assembly is at least partially inserted through a receiving hole of the inner laminate of composite material, and such that the inner laminate of composite material engages a structural connector of the fastener assembly, wherein the inner laminate of composite material forms a portion of the composite structure.

D1.1. The method of paragraph D1, further comprising forming the inner laminate of composite material and forming the receiving hole therethrough.

D2. The method of paragraph D1 or D1.1, wherein the fastener assembly is the fastener system of any of paragraphs A1-A53.

D3. The method of any of paragraphs D1-D2, wherein the fastener assembly is assembled according to the method of any of paragraphs C1-C9, prior to the positioning the fastener assembly.

D4. The method of any of paragraphs D1-D3, wherein the positioning the fastener assembly comprises positioning the fastener assembly such that a portion of the structural connector is positioned between the inner laminate of composite material and a/the retainer of the fastener assembly.

D5. The method of any of paragraphs D1-D4, wherein the inner laminate of composite material comprises a first plurality of layers of composite material.

D6. The method of any of paragraphs D1-D5, wherein the inner laminate of composite material comprises a first outer surface and a first inner surface, wherein the receiving hole extends from the first outer surface to the first inner surface, and wherein the first inner surface engages the structural connector.

D7. The method of any of paragraphs D1-D6, further comprising securing a middle laminate of composite material to an/the first upper surface of the inner laminate of composite material, wherein the middle laminate of composite material comprises a pocket configured to receive at least a portion of the receptacle therethrough, and wherein the pocket is further configured to receive a/the collar plate of the fastener system.

D8. The method of any of paragraphs D1-D7, further comprising positioning a/the collar plate of the fastener system onto the receptacle, such that a lower plate surface of the collar plate engages an/the first upper surface of the inner laminate of composite material.

D9. The method of paragraph D8, wherein the positioning the collar plate comprises positioning the collar plate within a/the pocket of a/the middle laminate of composite material.

D9.1. The method of paragraph D8 or D9, wherein the positioning the collar plate comprises locking the collar plate and the receptacle together by engaging a/the first plurality of stepped grooves of the collar plate, a/the second plurality of stepped grooves of the collar plate, a/the first plurality of receptacle grooves of the receptacle, and a/the second plurality of receptacle grooves of the receptacle, grooves.

D9.2. The method of any of paragraphs D8-D9.1, wherein the positioning the collar plate comprises engaging the collar plate and the receptacle such that self-diffusion occurs between them.

D10. The method of any of paragraphs D8-D9.2, wherein the positioning the collar plate comprises placing the collar plate slowly enough to substantially avoid uneven disruption of resin applied to the inner laminate of composite material.

D11. The method of any of paragraphs D1-D10, further comprising inserting a/the torque nail of the fastener system into the receptacle.

D12. The method of paragraph D11, wherein the inserting the torque nail comprises expanding the receptacle with the torque nail as it is inserted.

D12.1. The method of paragraph D11 or D12, wherein the inserting the torque nail comprises driving the torque nail into the receptacle, thereby causing deformation torque in the receptacle, in a/the retainer of the fastener assembly, and/or in a/the collar plate of the fastener system.

D12.2. The method of any of paragraphs D11-D12.1, wherein the inserting the torque nail comprises inserting the torque nail from a/the first outer surface of the inner laminate of composite material.

D13. The method of any of paragraphs D1-D12.2, further comprising applying an outer laminate of composite material.

D14. The method of paragraph D13, wherein the applying the outer laminate of composite material comprises covering a/the collar plate of the fastener system with the outer laminate of composite material.

D15. The method of paragraphs D13 or D14, wherein the applying the outer laminate of composite material comprises applying the outer laminate of composite material to a/the middle laminate of composite material, such that at least a portion of the middle laminate of composite material is covered by the outer laminate of composite material.

D16. The method of any of paragraphs D13-D15, wherein the applying the outer laminate of composite material comprises embedding a/the collar plate of the fastener system between the outer laminate of composite material and the inner laminate of composite material.

D17. The method of any of paragraphs D1-D16, wherein the outer laminate of composite material comprises a second plurality of layers of composite material.

D18. The method of any of paragraphs D1-D17, wherein a/the middle laminate of composite material comprises a third plurality of layers of composite material.

D19. The method of any of paragraphs D1-D18, wherein the inner laminate of composite material, an/the outer laminate of composite material, and/or a/the middle laminate of composite material together form the composite structure.

D20. The method of any of paragraphs D1-D19, further comprising securing the part to the structural connector, thereby coupling the part to the composite structure.

D20.1. The method of paragraph D20, wherein the securing the part is performed before the positioning the fastener assembly.

D20.2. The method of paragraph D20 or D20.1, wherein the securing the part is performed before adding and/or applying an/the outer laminate of composite material and a/the middle laminate of composite material to the inner laminate of composite material.

D20.3. The method of any of paragraphs D20-D20.2, further comprising holding the part in place with tooling until after adding and/or applying an/the outer laminate of composite material and a/the middle laminate of composite material.

D21. The method of any of paragraphs D1-D20.3, wherein the part comprises a frame, a fitting, and/or a bracket.

D22. The method of any of paragraphs D1-D21, wherein the composite structure comprises a carbon fiber skin of an aircraft fuselage.

D23. The method of any of paragraphs D1-D22, further comprising selecting a thickness of a/the yield region of the receptacle to allow insertion of a/the torque nail and/or a/the collar plate of the fastener system.

D24. The method of any of paragraphs D1-D23, further comprising cleaning and/or smoothing one or more surfaces of the fastener system to an extent sufficient for self-diffusion.

D25. The method of paragraph D24, wherein the one or more surfaces of the fastener system comprises a/the first engagement surface of a/the torque nail, a/the second engagement surface of the torque nail, a/the first inner receiving surface of the receptacle, and/or a/the second inner receiving surface of the receptacle.

D26. The method of any of paragraphs D1-D25, wherein the fastener system comprises the fastener assembly, a/the collar plate, and a/the torque nail.

D27. The method of any of paragraphs D1-D26, wherein the method of installing the fastener system for coupling the part to the composite structure is a method of forming an aircraft fuselage, wherein the composite structure is the aircraft fuselage.

D28. The method of any of paragraphs D1-D27, wherein the positioning the fastener assembly with respect to the inner laminate of composite material comprises positioning the fastener assembly via a/the first inner surface of the inner laminate of composite material, wherein the first inner surface forms an interior region of the composite structure.

D29. The method of paragraph D28, further comprising coupling the part to the structural connector from the interior region of the composite structure.

D30. The method of any of paragraphs D1-D29, wherein an outer surface of an/the outer laminate forms an exterior region of the composite structure.

D31. The method of any of paragraphs D1-D30, wherein the positioning the fastener assembly is performed before adding and/or applying an/the outer laminate of composite material and a/the middle laminate of composite material.

D32. The method of any of paragraphs D1-D31, further comprising heating the composite structure and the fastener system to cure the inner laminate of composite material, an/the outer laminate of composite material, and/or a/the middle laminate of composite of material.

D33. The method of paragraph D32, wherein the heating relaxes the part.

D34. The method of any of paragraphs D1-D33, wherein the positioning the fastener assembly comprises installing a/the retainer with the receptacle.

E1. An aircraft comprising the fastening system of any of paragraphs A1-A53 and/or the assembly of any of paragraphs B1-1313.

F1. The use of the fastening system of any of paragraphs A1-A53 to couple a part to a composite structure.

F2. The use of the fastening system of any of paragraphs A1-A53 to couple a frame to an aircraft fuselage.

F3. The use of the assembly of the assembly of any of paragraphs B1-B13 in manufacturing an aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

The invention claimed is:

1. A fastener system for coupling a part to a composite structure, the fastener system comprising:
    a receptacle configured to be embedded at least partially within the composite structure, wherein the receptacle comprises a receiving portion configured to receive at least a portion of a torque nail;
    a structural connector configured to engage the receptacle and the part;
    the torque nail, wherein the torque nail is configured to be received at least partially within the receptacle, wherein the torque nail is sized and shaped with respect to the receptacle such that it expands the receiving portion of the receptacle when pressed into the receiving portion; and
    a collar plate configured to be embedded within the composite structure and configured to distribute forces from the torque nail being pressed into the receiving portion, wherein the fastener system is configured to engage the part and the composite structure such that it couples the part to the composite structure.

2. The fastener system according to claim 1, wherein the collar plate comprises an opening configured to receive the receptacle therethrough, and wherein the torque nail is configured to expand the receiving portion of the receptacle against the collar plate when the torque nail is inserted into the receiving portion of the receptacle.

3. The fastener system according to claim 2, wherein the opening of the collar plate comprises a first plurality of stepped grooves and a second plurality of stepped grooves, wherein the first plurality of stepped grooves is positioned opposite the second plurality of stepped grooves, and wherein the first plurality of stepped grooves and the second plurality of stepped grooves are configured to plastically deform when the torque nail is inserted into the receiving portion of the receptacle.

4. The fastener system according to claim 3, wherein the first plurality of stepped grooves of the collar plate are configured to engage a first plurality of receptacle grooves of the receptacle, and wherein the second plurality of stepped grooves of the collar plate are configured to engage a second plurality of receptacle grooves of the receptacle.

5. The fastener system according to claim 1, wherein the receiving portion of the receptacle is defined by a first inner receiving surface and a second inner receiving surface, and wherein the receptacle comprises:
    a first elongated grooved surface including a first plurality of receptacle grooves;
    a second elongated grooved surface including a second plurality of receptacle grooves; and
    a yield region positioned between the first inner receiving surface and the second inner receiving surface, wherein the yield region is configured to bend such that the first elongated grooved surface and the second elongated grooved surface are forced closer together when the collar plate is inserted onto the receptacle, and wherein the yield region is configured to allow expansion of the receiving portion such that the first elongated grooved surface and the second elongated grooved surface are moved farther apart from one another when the torque nail is inserted into the receiving portion.

6. The fastener system according to claim 5, wherein the yield region comprises a first yield region and a second yield region, wherein the receptacle further comprises a slot-shaped opening through which a lower portion of the torque nail is configured to be inserted, and wherein the slot-shaped opening extends between the first yield region and the second yield region.

7. The fastener system according to claim 6, wherein the receptacle further comprises a first pressing surface and a second pressing surface, wherein the receptacle is configured to receive the lower portion of the torque nail between the first pressing surface and the second pressing surface when the torque nail is positioned within the receptacle.

8. The fastener system according to claim 7, wherein the fastener system comprises a retainer configured to constrain the receptacle, wherein the receptacle further comprises a first retainer-receiving recess and a second retainer-receiving recess, positioned opposite one another, wherein the receptacle is configured to receive the retainer in the first retainer-receiving recess and the second retainer-receiving recess, wherein the retainer comprises a first elongated portion configured to engage the first retainer-receiving recess, wherein the retainer further comprises a second elongated portion configured to engage the second retainer-receiving recess.

9. The fastener system according to claim 8, wherein the retainer of the fastening system presses inward on the first pressing surface and the second pressing surface when the retainer is positioned on the receptacle.

10. The fastener system according to claim 5, wherein the torque nail comprises a wedge-shaped portion having a first engagement surface and a second engagement surface, wherein the first engagement surface and the second engagement surface are configured to engage the receptacle when the torque nail is positioned within the receptacle, wherein the wedge-shaped portion is configured to be received in the receiving portion of the receptacle such that the first engagement surface engages the first inner receiving surface of the receptacle and such that the second engagement surface engages the second inner receiving surface of the receptacle via one or more selected from the group consisting of self-diffusion, friction connection, and deformation.

11. The fastener system according to claim 1, wherein the structural connector comprises a slot configured to receive the receptacle therethrough, wherein the receptacle comprises a first outer wall and a second outer wall, and wherein the structural connector contacts the first outer wall and the second outer wall when the structural connector is secured to the receptacle.

12. The fastener system according to claim 1, wherein the part comprises a frame for an aircraft fuselage, and wherein the composite structure comprises a skin of the aircraft fuselage.

13. An assembly, comprising:
the fastener system according to claim 1;
a first laminate of composite material; and
a second laminate of composite material, wherein the collar plate of the fastener system is positioned between the first laminate of composite material and the second laminate of composite material, wherein at least a portion of the structural connector of the fastener system is positioned adjacent the first laminate of composite material.

14. The assembly according to claim 13, further comprising a middle laminate of composite material positioned between the first laminate of composite material and the second laminate of composite material, wherein the middle laminate of composite material has a laminate thickness that is substantially equal to a plate thickness of the collar plate.

15. A method of assembling a fastener assembly for coupling a part to a composite structure, the method comprising:
providing the fastener assembly, wherein the fastener assembly comprises:
a receptacle configured to be embedded at least partially within the composite structure, wherein the receptacle comprises:
a receiving portion configured to receive at least a portion of a torque nail;
a first retainer-receiving recess; and
a second retainer-receiving recess positioned opposite the first retainer-receiving recess;
a structural connector configured to engage the receptacle and the part; and
a retainer configured to constrain the receptacle, wherein the receptacle is configured to receive the retainer in the first retainer-receiving recess and the second retainer-receiving recess, wherein the retainer comprises a first elongated portion configured to engage the first retainer-receiving recess, wherein the retainer further comprises a second elongated portion configured to engage the second retainer-receiving recess;
positioning the retainer on the receptacle by sliding the retainer into the first retainer-receiving recess and the second retainer-receiving recess; and
positioning the structural connector on the receptacle, wherein the positioning the structural connector comprises compressing the receptacle, wherein the fastener assembly is configured to couple the part to the composite structure, via the structural connector.

16. A method of installing a fastener system for coupling a part to a composite structure, wherein the fastener system comprises a fastener assembly, a collar plate, and a torque nail, the method comprising:
forming a first laminate of composite material having a receiving hole formed therethrough;
positioning the fastener assembly with respect to the first laminate of composite material such that a receptacle of the fastener assembly is at least partially inserted through the receiving hole and such that the first laminate of composite material engages a structural connector of the fastener assembly, wherein the receptacle, the structural connector, and a retainer of the fastener assembly are assembled together prior to the positioning the fastener assembly, wherein the first laminate of composite material comprises a first upper surface and a first inner surface, wherein the receiving hole extends from a first outer surface to the first inner surface, and wherein the first inner surface engages the structural connector;
securing a middle laminate of composite material to the first upper surface of the first laminate of composite material, wherein the middle laminate of composite material comprises a pocket configured to receive at least a portion of the receptacle therein, and wherein the pocket is further configured to receive the collar plate of the fastener system;

positioning the collar plate onto the receptacle and into the pocket of the middle laminate of composite material, such that a lower plate surface of the collar plate engages the first upper surface of the first laminate of composite material;

inserting the torque nail of the fastener system into the receptacle; and applying an outer laminate of composite material which covers the collar plate and at least a portion of the middle laminate of composite material, thereby embedding the collar plate between the outer laminate of composite material and the first laminate of composite material, wherein the first laminate of composite material, the middle laminate of composite material, and the outer laminate of composite material together form the composite structure.

17. The method according to claim 16, wherein the positioning the collar plate comprises locking the collar plate and the receptacle together by engaging a first plurality of stepped grooves of the collar plate with a first plurality of receptacle grooves of the receptacle, and engaging a second plurality of stepped grooves of the collar plate with a second plurality of receptacle grooves of the receptacle.

18. The method according to claim 16, wherein the inserting the torque nail comprises expanding the receptacle with the torque nail as it is inserted.

19. The method according to claim 16, further comprising securing the part to the structural connector, thereby coupling the part to the composite structure, wherein the part comprises a frame for an aircraft fuselage, and wherein the composite structure comprises a skin of the aircraft fuselage.

20. The method according to claim 16, further comprising heating the composite structure and the fastener system to cure the first laminate of composite material, the outer laminate of composite material, and the middle laminate of composite of material.

\* \* \* \* \*